(12) United States Patent
Minnick et al.

(10) Patent No.: US 6,370,381 B1
(45) Date of Patent: Apr. 9, 2002

(54) MULTIPLE CHANNEL COMMUNICATIONS SYSTEM

(75) Inventors: James A. Minnick, Central City; Michael A. Bueter, Swisher; Jeffrey D. Coil, Marion; David C. Krueger, Cedar Rapids, all of IA (US)

(73) Assignee: Siemens Transportation Systems, Inc., Cedar Rapids, IA (US)

( * ) Notice: Subject to any disclaimer, the term of this patent is extended or adjusted under 35 U.S.C. 154(b) by 0 days.

(21) Appl. No.: 09/239,690

(22) Filed: Jan. 29, 1999

(51) Int. Cl.[7] ................................................. H04Q 7/20
(52) U.S. Cl. ...................... 455/445; 455/517; 455/521
(58) Field of Search ................................. 455/445, 450, 455/452, 453, 509, 515, 517, 518, 520, 521, 436, 510; 370/329, 341, 431

(56) References Cited

U.S. PATENT DOCUMENTS

| | | | |
|---|---|---|---|
| 4,870,408 A | * 9/1989 | Dunek et al. | 455/513 |
| 4,926,495 A | * 5/1990 | Comroe et al. | 455/519 |
| 5,257,402 A | 10/1993 | Crisler | 455/33.2 |
| 5,408,680 A | 4/1995 | Hattey et al. | 455/518 |
| 5,479,477 A | * 12/1995 | McVey et al. | 455/450 |
| 5,524,273 A | * 6/1996 | Coley et al. | 455/509 |
| 5,650,995 A | * 7/1997 | Kent | 455/520 |
| 5,812,951 A | 9/1998 | Ganesan et al. | 455/445 |
| 5,850,611 A | * 12/1998 | Krebs | 455/518 |
| 5,854,787 A | 12/1998 | Dodge et al. | 370/349 |
| 5,870,676 A | * 2/1999 | Durvasula | 455/453 |
| 5,987,332 A | * 11/1999 | Gettleman et al. | 455/518 |
| 6,026,296 A | * 2/2000 | Sanders, III et al. | 455/520 |
| 6,069,871 A | * 5/2000 | Sharma et al. | 455/452 |

* cited by examiner

*Primary Examiner*—Nay Maung
*Assistant Examiner*—Quochien B. Vuong

(57) ABSTRACT

A multi-channel communications system for communications between a mobile units and dispatch agencies through tower sites under control of a multi-channel communication controller. The method of communications used is time division multiple access with provisions for alternate methods. The mobile units and dispatch agencies have forms of identifications to route messages between the mobile units and dispatch agencies according to the forms of identification. The forms of identification are resolved from one form to another to operate with the alternate methods of communications. The mobile units are handed off from one communications channel to another by the multi-channel controller as channel loading conditions exceed a predetermined limit. Mobile units change tower sites as the geographic coverage of a tower site changes. Mobile units determine distance to a tower site by computing distance to a tower site by using GPS position information of the mobile unit and the known locations of the tower sites to compute signal strength.

30 Claims, 15 Drawing Sheets

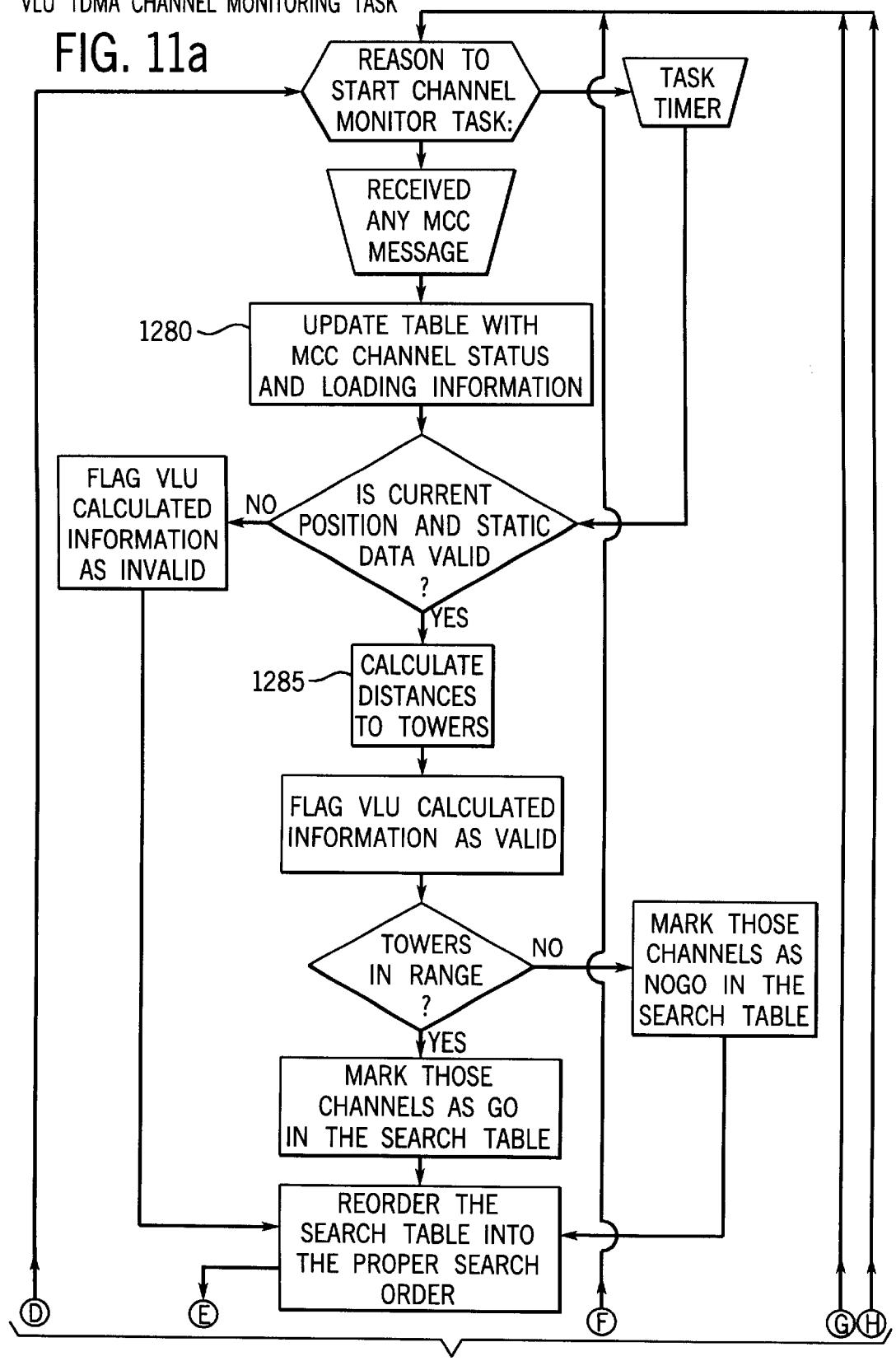

MULTIPLE CHANNEL COMMUNICATIONS SYSTEM

BACKGROUND OF THE INVENTION

This invention relates to communications systems and more specifically to an integrated digital multi-channel communications system for operation with multiple mobile units, dispatch agencies, communications channels, and methods.

Mobile communications systems are used in many applications such as police and fire department dispatching and now in such new applications as control of transit bus systems and other municipal government functions. These new communications requirements are leading to the development of integrated local government communications systems.

Conventional communications systems in use in such applications as local governments include mobile users and dispatch agencies that operate on a small number of channels, sometimes as few one or two, with one or two tower sites usually over voice channels only while some systems are now offering data communications. Mobile users communicate with their dispatch agencies over these channels using their system tower sites. Automatic routing of messages between users is not available in these conventional communications systems. If the loading on channels becomes excessive, users are asked to move to alternate channels and if the range from a mobile unit to the tower site becomes excessive, the users must manually switch over to another tower site if available.

The new applications of communications to such requirements as integrated local government systems have increased the need to support large fleets of 4000 vehicles or more over large geographical areas. With the increase in the number of mobile and dispatch agency users, the need to effectively increase the capacity of the communications system by utilizing more channels has arisen. When channel capacity has reached overload conditions, mobile units must be handed off to other channels to balance the channel loading. When mobile units exceed the range of fixed station or tower sites, the mobile unit must be handed off to another tower site with the needed coverage. These hand-offs must be done automatically without loss of messages and be transparent to the users.

The predominant form of communications with most previous communications systems is voice. Voice communications are slow and require a voice channel for each user. The number of voice communications channels must be reduced while increasing the rate of information transfer. To do this digital communications methods must be developed that enable rapid transfer of data over a limited number of channels.

Currently local government agencies have a large variety of existing communications systems that must be supported due to the high cost of replacing these systems. The mobile units must also interface alternate forms of communications such as cellular phone systems. In addition a multiple local government agencies require communications through a single common communications system to reduce infrastructure costs.

Integrated local government communications systems require reliable operation for the safety of the system users and the public being served. The communications system must be reliable and provide failsafe capabilities.

Accordingly a new multi-channel communications system is needed to meet the current and future needs of users in such applications as integrated local governments.

SUMMARY OF THE INVENTION

The objectives of the invention are met with a new mobile digital multi-channel communications system architecture that has features in the mobile units, tower sites, dispatch agencies, and a multi-channel controller (MCC) to arrive at a cohesive integrated communications solution.

The multi-channel communication system includes multiple mobile units, several tower sites, a multi-channel controller, and several dispatch agencies. In some applications redundant multi-channel controllers may be used to improve system reliability. The communications system is primarily designed to be a time division multiple access (TDMA) system with interface capabilities to wide variety of existing systems. The multi-channel communications system includes mobile units each equipped with a vehicle logic unit (VLU) for control of the mobile unit and its interface with the system. The mobile units have a form of identification used in establishing communications. Also included are tower sites for one or more TDMA communications channels for communications with the mobile units. Several dispatch agencies also having a form of identification for use by the dispatch agencies to define the mobile units for which the agencies are responsible are connected to the communications system. The multi-channel controller is a computer running the multi-channel communications software to control the multi-channel communications system. A multi-channel controller is connected to the tower sites and the dispatch agencies for directing outgoing messages from the dispatch agencies to the mobile units and for routing incoming messages from the mobile units to dispatch agencies according to the form of identification. The multi-channel controller determines TDMA channel loading and hands off selected mobile units from one channel to another when loading on a channel becomes excessive. The multi-channel controller also selects and connects the mobile units to another tower site in another geographic area when the geographic area covered by the first tower site becomes inadequate. The multi-channel controller routes messages to a new TDMA channel when a current channel of communications fails.

It is therefore an object of the present invention to provide a new multi-channel communications system to meet the current and future needs of users in such applications as integrated local governments.

It is another object of the present invention to provide a communications system that increases the data network capacity through the use of additional channels to increase the bandwidth or load capacity automatically as the need arises.

It is a feature of the present invention to route messages from the mobile units to the proper dispatch agencies and from the dispatch agencies to the proper mobile units without being constrained to any individual channel or tower site by using forms of identification with the mobile units and the dispatch agencies.

It is another feature of the present invention to determine communications channel loading to hand off the mobile units from one communications channel to another communications channel at a tower site when loading on the first communications channel becomes excessive.

It is a feature of the present invention to increase the geographic coverage of the communications system through the use of multiple tower sites to enable the mobile units to roam between coverage areas of the tower sites while maintaining communications by selecting a new tower site when the coverage of the first tower site is exceeded.

It is an advantage of the invention to interface many types of existing communications systems.

An advantage of the invention is a reliable communications system with redundant and fail safe functions at a low cost to the system users.

These and other objects, features, and advantages are disclosed and claimed in the specification, figures, and claims of the present application.

BRIEF DESCRIPTION OF THE DRAWINGS

The invention will now be described by way of example only with reference to the accompanying drawings in which:

FIGS. 11a and 11b are flow charts of the mobile unit's vehicle logic unit channel monitoring function showing how the mobile unit changes channels and tower sites;

DETAILED DESCRIPTION

System Overview

Figure 1:
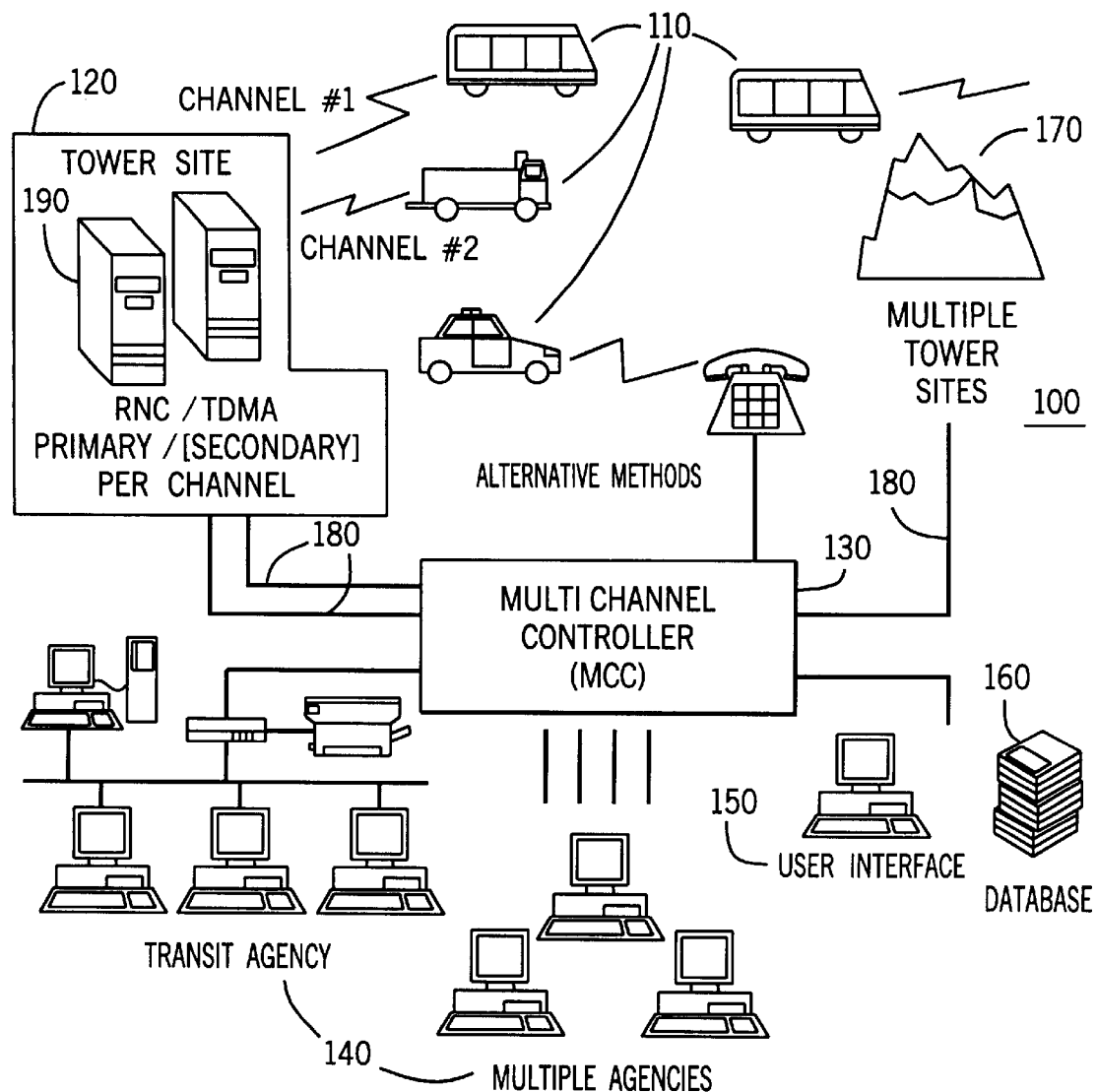
FIG. 1 is a block diagram of a multi-channel communications system in accordance with the present invention showing the major system elements.

FIG. 1 is one illustrative embodiment of the present invention. FIG. 1 illustrates the multi-channel communications system 100 and relationships between the components of the system. The primary system components consist of mobile units 110, tower sites 120 and 170 with single and multiple towers respectively, a multi-channel controller (MCC) 130, and dispatch agencies 140. The mobile units 110 communicate with the dispatch agencies 140 through the tower sites 120 and 170 under control of the multi-channel controller 130.

The mobile units 110 of FIG. 1 accommodated by the multi-channel communications system 100 can be a wide variety of vehicles such as fire trucks, police cars, and buses. Each of the mobile units 110 is equipped with radio equipment, such as a transmitter and receiver or a transceiver and an antenna for digital data communications, and a vehicle logic unit (VLU). The vehicle logic unit controls the mobile unit interface with the other elements in multi-channel communications system 100. The mobile units 110 function in an autonomous mode. The mobile units 110 maintain a database of tower site locations and channel loading and a priority-sorted list of alternate communications methods. The mobile units 110 include global positioning system (GPS) receivers for position determination. The mobile unit GPS position is compared to the known position of a tower site 120 or 170 to determine range to the tower site. From this range determination a pseudo signal strength prediction can be made for use in selecting a tower site. The mobile units 110 are responsible for initiating a hand-off between tower sites 120 and 170 or alternative communications methods based on geographic coverage and/or cost constraints. The decisions to change channels, tower sites, or communications methods are aided by information provided periodically by the multi-channel controller 130 regarding channel availability and loading status.

The dispatch agencies 140 of FIG. 1 are agencies such as police and fire departments and transit authorities using the multi-channel communications system 100 for digital data communications. Computer terminals at the dispatch agencies 140 are connected to the multi-channel controller 130 through such methods as telephone lines and modems and local area networks (LAN). Like the mobile units 110, the dispatch agencies 140 function autonomously from the multi-channel communications system 100. However, each agency does have several responsibilities for the proper setup and control of the multi-channel controller 130. The setup involves defining an identifier (ID) used by an individual dispatch agency 140 to identify the mobile units 110 for which it is responsible. Each dispatch agency 140 also defines and prioritizes which communications methods are allowed and supported by its fleet of mobile units 110. Each dispatch agency 140 may also grant permission to allow other agencies to receive messages from its fleet of mobile units as well as request permission to view messages from other dispatch agencies. During operations each dispatch agency 140 will be responsible for requesting polling rate changes based on mobile unit status, location, and other internal rules. In the event that communications resources can not meet the request, notifications will be returned. Each dispatch agency 140 is also responsible for requesting that mobile units 110 be removed from the system due to logoff or shutdown.

The primary method of communications of the multi-channel communications system 100 is time division multiple access (TDMA) through the RNC (radio network controller)/TDMA service 190 at the tower sites 120 as shown in FIG. 1. RNC/TDMA service 190 is also at tower site 170 (not shown). TDMA communications methods are well known and used in many applications such as military satellite communications systems and commercial cellular telephone systems. A radio frequency data communications system that may be used in the present invention is disclosed in U.S. Pat. No. 5,854,787 incorporated herein by reference. TDMA communications systems allow many stations or mobile units 110 and dispatch agencies 140 to operate on a single carrier frequency or channel. In a single-channel system the radio equipment of all the stations in the communications system is tuned to the same frequency. Each mobile unit 110 transmits during its assigned time slot. Time slots are usually short such as 120 milliseconds requiring the transmission of a message in bursts of digital data. These burst messages may consist of a frame header followed by the digital data message. The frame header may contain information such as the address or identification of the transmitting station, message type, and number of data packets contained in the digital data message. The RNC/TDMA service 190 polls an individual mobile unit 110 at a specific time slot. The rate at which this is done is known as the polling rate. For example, a mobile unit 110 is assigned a slot once every 60 seconds resulting in a 60 second polling rate. The polling rate is adjustable to meet system communications requirements.

The multi-channel communications system 100 may support, for example, ten different TDMA channels at the tower sites 120 and 170 in FIG. 1. Ten TDMA channels is a typical number but the multi-channel communications system is not limited to ten. This channel support may be in the form of ten single-channel towers 170 at a single site or may be a single 10-channel tower at ten sites or any combination thereof. Alternate communications method providers connect to the multi-channel communications system through a gateway. These alternate modes of communication are discussed later. Many tower sites 120 and 170 may be dispersed over a wide geographic area to obtain the required communication system geographic coverage. Each tower site 120 and 170 requires a least one dedicated connection 180 such as a telephone line or a microwave link for each site. In a fully redundant configuration, two connections 180, primary and secondary, may be provided to the RNC/TDMA service 190 for each tower site 120.

The multi-channel controller 130 of FIG. 1 is the heart of the multi-channel communications system 100. The multi-channel controller 130 is a computer running the multi-channel controller software. The multi-channel controller 130 has two primary functions that are to direct outgoing messages to the destination mobile units 110 and route incoming messages to the dispatch agency 140 responsible for those mobile units. The incoming and outgoing messages are intelligently passed through the appropriate communications channel in a way that is transparent to the users. Another function of the multi-channel controller 130 is to manage the communications resources for mobile units 110 roaming by handing off mobile units from one tower site 120 or 170 to another when the range is exceeded on the first tower site and communications channel load balancing when load on a channel becomes excessive. A single multi-channel controller 130 may typically support 15 dispatch agencies 140 with a combined total of 4000 mobile units 110. However, the multi-channel communications system of the present invention is not limited to these numbers of dispatch agencies and mobile units.

One of the primary functions of the multi-channel controller 130 is to route outgoing messages from a dispatch agency 140 to the communications channel assigned for a desired mobile unit 110. This channel may be a conventional TDMA channel or potentially an alternative method. To support this routing, the multi-channel controller 130 maintains a mapping of mobile units 110 to their channel assignments. This mapping converts between different addressing schemes by resolving the identifiers. For example, in order to send a message to mobile unit #15 in a group of mobile units 110, the mapping function converts the destination #15 to a telephone number such as 555-1212 or an internet protocol (IP) such as 192.128.8.1 as required by the alternate communications method. This information is supplied as part of the dispatch agency's configuration data. Mobile units 110 are added as they begin communicating through a channel and removed either through a time-out (when polled) or by direction from the associated dispatch agency 140.

The other primary function of the multi-channel controller 130 is to analyze the source of each mobile unit message and route it to the appropriate dispatch agency 140. A routing table in the multi-channel controller 130 is used to associate dispatch agency identifiers (ID) to their respective connections. In the event that an alternative communications method is used, the mobile unit identifier may also need to be determined by reversing the address mapping mentioned above. Dispatch agencies 140 are informed as to which mobile units 110 are currently active and whether reporting is polling or exception based. Mobile units 110 are also informed if their dispatch agency 140 is not available.

The multi-channel controller 130 also coordinates tower site to tower site handoff requests from the mobile units 110 while they are roaming about the geographic area. This is done when a mobile unit 110 approaches the communications range limit of a present tower site 120 or 170. The multi-channel controller 130 requests that a mobile unit 110 is added to a new tower site 120 or 170 and removes it from the old tower site 120 or 170 after the handoff is complete. It also supplies periodic loading information to the mobile units 110 to aid them in making smart handoff decisions.

Under special conditions when one of the RNC/TDMA service 190 channels on a multi-channel tower site 120 or 170 becomes overloaded and can no longer support the requested polling rates for its assigned mobile units 110, a site balance may be performed. In this situation, the multi-channel controller 130 may command a handoff of selected mobile units 110 from one channel to another to attempt to balance the load. The operation is performed in much the same manner as the site-to-site handoff except that the multi-channel controller 130 is commanding the mobile unit 110 instead of the mobile unit asking permission. The multi-channel controller 130 only attempts intra-site load balancing. It is assumed that the system will become somewhat self-balancing on a site-to-site basis by having the mobile unit intelligently request handoffs based on loading information.

The multi-channel controller 130 may be located at a stand-alone facility or as part of one of the dispatch agencies 140. In either case, a user interface 150 in the form of a computer is used for configuration of the mobile unit 110 and dispatch agency 140 lookup tables. In addition to configuration and setup, the user interface 150 provides the ability to view various performance statistics. Having such ability allows monitoring of the multi-channel communications system 100 for insight into possible configuration parameter adjustments. The multi-channel controller 130 has a number of configurable parameters that are essential for the performance and redundancy capabilities of the system. These parameters are loaded into the system automatically behind the scenes during initial startup and normal operating conditions.

A database 160 is used to support the previously described functional areas. The information maintained and provided to the dispatch agencies 140 for correlation with mobile unit information is summarized and archived in the database 160. This information includes the mobile unit channel assignments and polling rates; mobile unit address mappings; dispatch agency IDs, connections, and permissions; and system performance statistics.

Multi-Channel Controller

Figure 2:
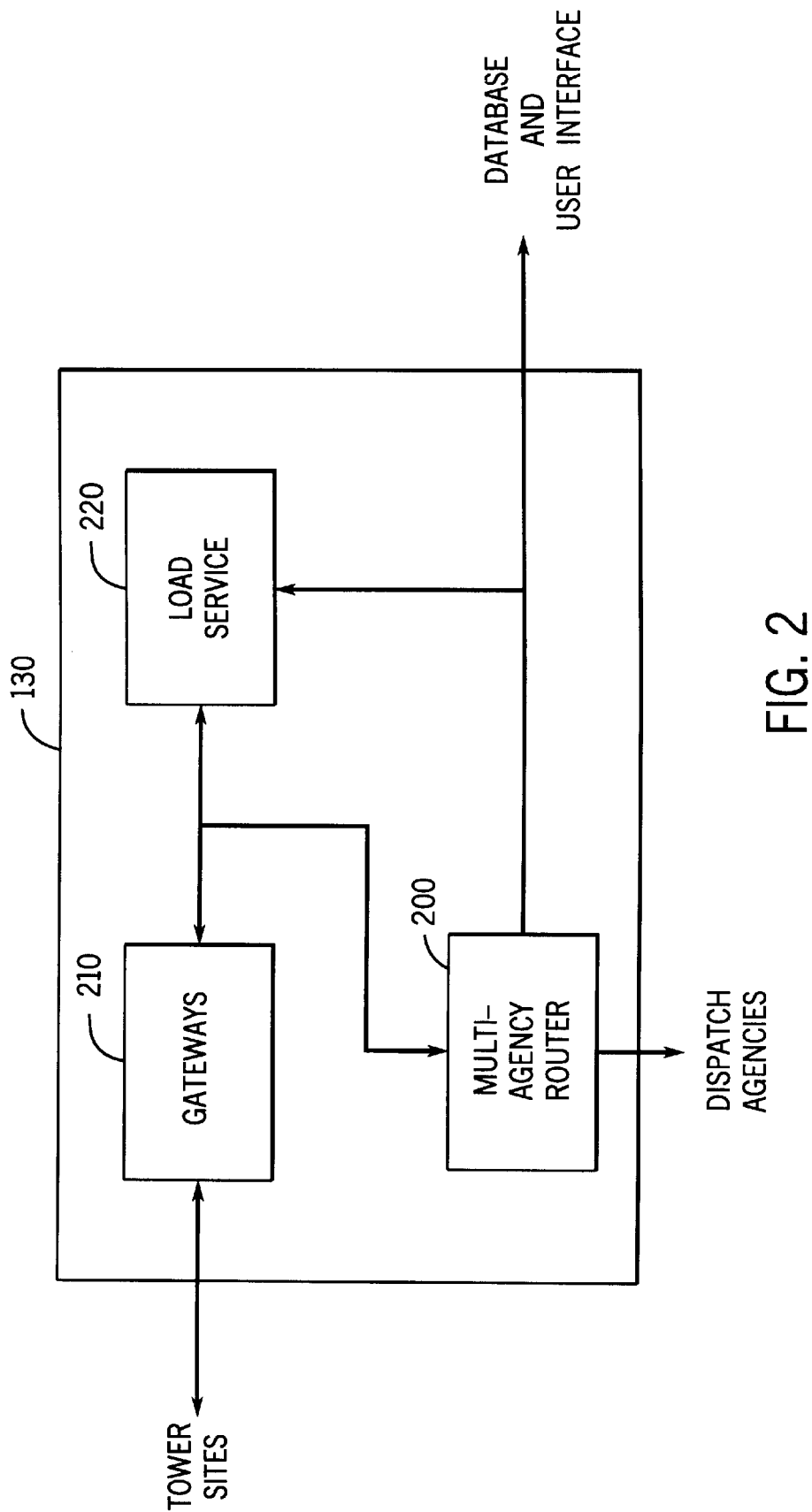
FIG. 2 is a functional block diagram of a multi-channel controller used to control the operation of the multi-channel communications system.

The multi-channel controller 130 embedded functions are shown in block diagram form in FIG. 2. These functions include the multi-agency router 200, the gateways 210, and the load service 220. Each of the functions performs the tasks of the multi-channel controller 130 summarized in the system overview above and described in detail in the following paragraphs.

The multi-agency router (MAR) 200 shown in FIG. 2 is the hub of the multi-channel controller 130 and the entire multi-channel communications system 100. The multi-agency router 200 is a redundant service that is responsible for the message routing to and from the mobile units 110 and the dispatch agencies 140. Having an additional copy of the MMC software running on another computer provides system redundancy.

The multi-agency router is connected to the multi-channel controller gateways 210. The gateways 210 are software modules responsible for setting up all the active connections to the alternate communications channels such as CDPD, AMPS, or EDACS. EDACS is the Ericsson Enhanced Digital Access Communications System, AMPS is the Analog Mobile Phone System, and CDPD is the Cellular Digital Packet Data System. Using EDACS as an example, the gateway 210 would be the layer that connects the multi-channel controller 130 to the EDACS client software. These gateways 210 are part of the multi-channel controller 130 and additional modules can be developed as needed and be plugged in later to interface additional communications channels with no impact to the multi-agency router 200.

Figure 3:
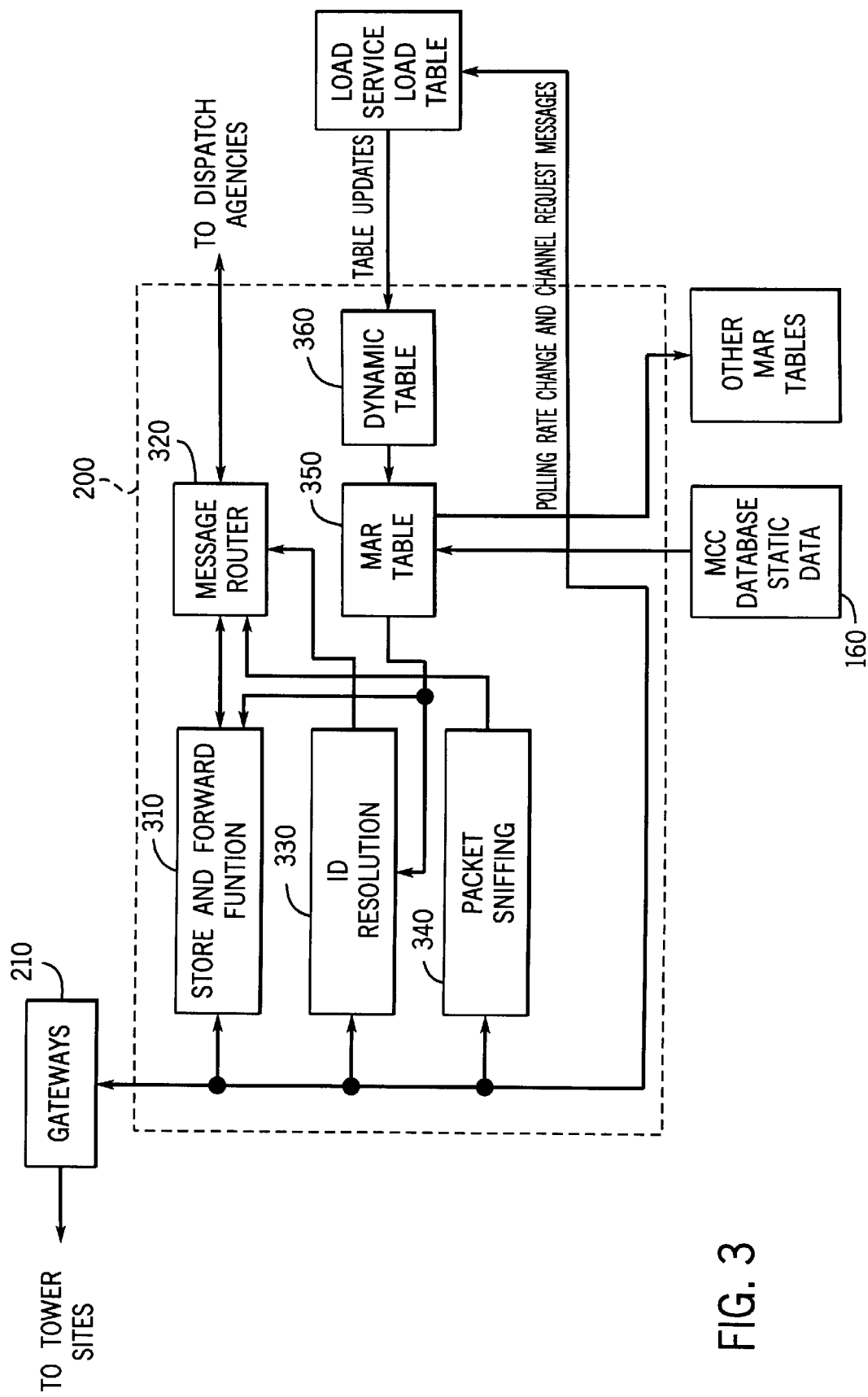
FIG. 3 is a block diagram of the multi-agency router functions contained in the multi-channel controller.

A functional block diagram of the multi-agency router (MAR) 200 is shown in FIG. 3. The functions included in the multi-agency router 200 are the store and forward function 310, the message router function 320, the ID resolution function 330, and packet sniffing function 340. Also included in the multi-agency router are the multi-agency router table 350 and a dynamic data table 360.

The primary function of the multi-agency router 200 is routing of messages between the mobile units 110 and dispatch agencies 140. This is accomplished by the message routing function 320 by determining the message destination by the identifier (ID) attached to the message in the preamble. ID resolution is performed to determine what the current channel communications method protocol is such as IP (Internet Protocol) for some of the alternate forms of communications, ID for TDMA communications, or telephone number for cellular telephone communications.

Two types of data are needed for the multi-agency router 200 to accomplish the routing functions, the static data and the dynamic data. The static data, shown in exemplary fashion in Table 1, contains the information needed to identify the mobile unit 110 and dispatch agency 140 on the communications network. In Table 1 the mobile unit or vehicle ID is 2049, the vehicle Internet Protocol Address is 192.128.8.1, the Dispatch Agency Identifier is 8, and the available communications links or methods are TDMA and others as listed. This static data is stored in the multi-channel controller database 160 and is loaded into the multi-agency router table 350 at run time. The dynamic data table 360 is stored in the multi-agency router 200 and contains all of the real time information concerning the mobile units 110 as shown in exemplary fashion in Table 2. In this example a mobile unit 110 is on channel 1 and is changing to channel 2 as indicated by the channel change flag. This data is merged to create the multi-agency router table 350 in FIG. 3 and as shown in Table 3 below.

TABLE 1

| Vehicle ID | Vehicle IP Address | Dispatch Agency Identifier | Available Comm Links |
|---|---|---|---|
| 2049 | 192.128.8.1 | 8 | TDMA,EDACS,ETC. |

TABLE 2

| Current Channel | New Channel | Channel Change Flag |
|---|---|---|
| 1 | 2 | 0 |

TABLE 3

| Vehicle ID | Vehicle IP Address | Local Agency Identifier | Available Comm Links | Static Data |
|---|---|---|---|---|
| 2049 | 191.128.8.1 | 8 | TDMA, EDACS, ETC. | |

| Current Channel | New Channel | Channel Change Flag | Dynamic Data |
|---|---|---|---|
| 1 | 2 | 0 | |

When performing the packet sniffing function 340, the multi-agency router 200 monitors the message traffic from the mobile units 110 and verifies which communication link the mobile units 110 are operating on. The multi-agency router packet sniffing function 340 also examines the source and destination of the message and the multi-agency router message routing function 320 routes accordingly.

When a message arrives from a tower site 120 of FIG. 1, the multi-agency router 200 must first determine if it is a mobile unit data message or an internal multi-channel controller control message. As shown in the flow chart in FIG. 4, when the message is determined to be from a mobile unit 110 and not a control message (step 400) the multi-agency router 200 looks to see if the mobile unit 110 is listed in the multi-agency router table 350 (step 410) to determine which mobile unit 110 the message is from. If the mobile unit 110 is listed in the multi-agency router table 350, the multi-agency router 200 then verifies that the link the message came in on is in sync with multi-agency router table's current channel field (420). The multi-agency router 200 then checks the channel change flag status (430) and responds accordingly to the load service 220 (step 440). The multi-agency router 200 then looks up which dispatch agency 140 the mobile unit 110 belongs to at step 450 and routes the message to the dispatch agency 140 (step 460). If the mobile unit 110 is not listed in the multi-agency router table 350 as determined at step 410, the multi-agency router 200 adds the mobile unit 110 to the static data table in the database 160 through the ID to IP resolution function (step 470). The information concerning the new mobile unit 110 is then added to the database 160 (step 480), a log report is generated (step 490) and sent to the dispatch agency 140

(step 450 and 460). It is the dispatch agency's responsibility to notify the multi-channel controller 130 of the rest of the mobile unit's static data. This activity causes an event change to be sent to all other dispatch agencies 140 in the multi-channel controller system 100.

Figure 4:
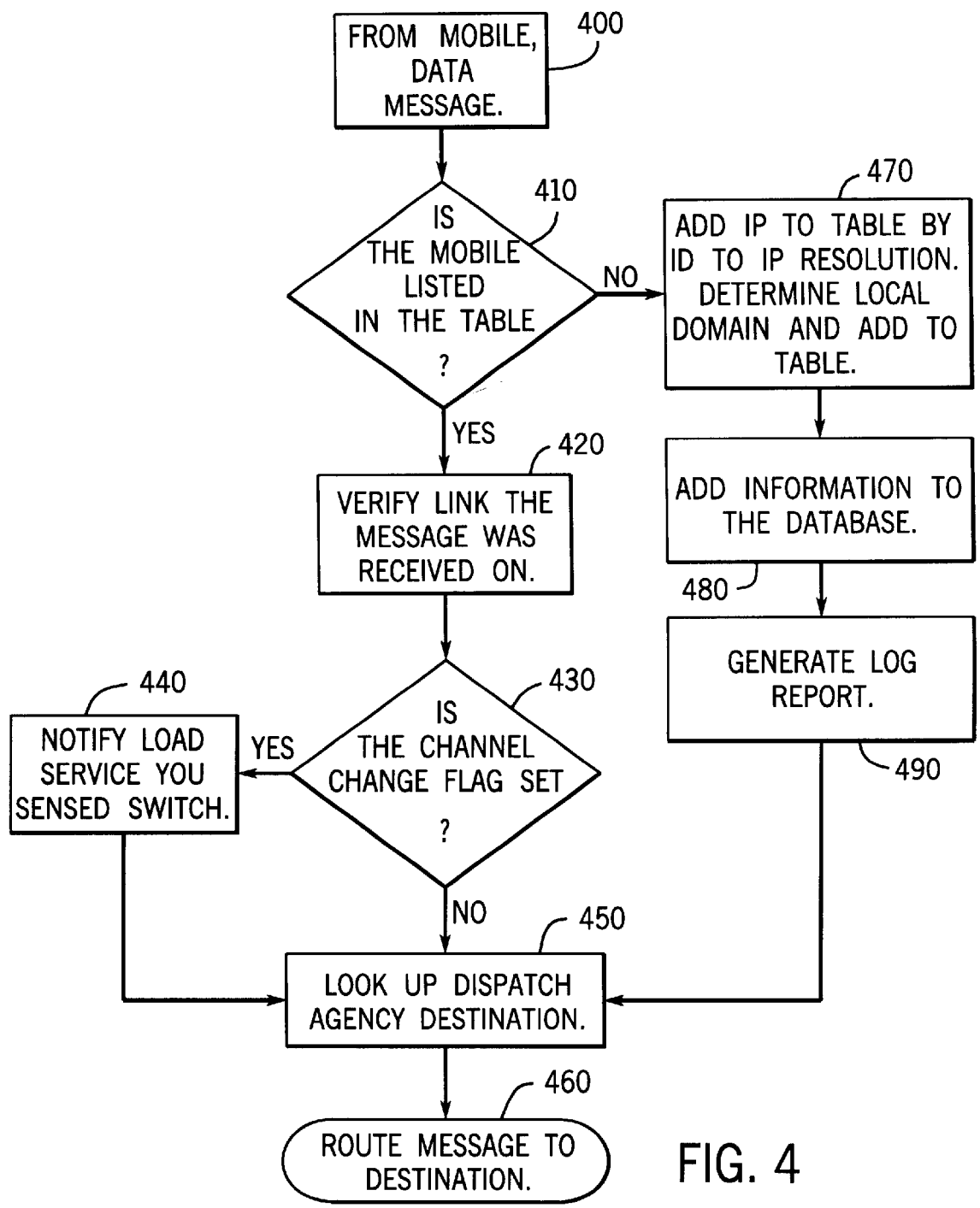
FIG. 4 is a flow diagram showing the mobile unit to dispatch agency message routing function performed by the multi-agency router of FIG. 3.

The following example shows how the multi-agency router ID resolution function 330 of FIG. 3 resolves the system ID of the mobile unit 110 to an IP at step 470 in FIG. 4 and determines the dispatch agency 140 to which the mobile unit 110 belongs. The mask bit, which is shown as 5 in this example, is configurable allowing flexibility in the number of networks and hosts.

Vehicle ID=2049=16 bits=00001.000 00000001=8.1 (5 bits for the dispatch agency network (mask bit) and 11 bits for the mobile unit ID). The dispatch agency network is 8 and the multi-agency router routes this message to the appropriate dispatch agency.

The range of IDs for this mask is 2049–*4080 and the IPs are as follows:

| | |
|---|---|
| X.X.8.1~254 | X.X.9.1~254 |
| X.X.10.1~254 | X.X.11.1~254 |
| X.X.12.1~254 | X.X.13.1~254 |
| X.X.14.1~254 | X.X.15.1~254 |

*X.X.X.0 and X.X.X.255 are not valid IP addresses.

Internal control messages that the multi-agency router 200 receives from various sources and the actions taken by the multi-agency router 200 consist of the following:

1. Table Updates. These are messages from the load service 220 that change the dynamic multi-agency router table 360.
2. AddNotification_Msg. This message is sent from the RNC/TDMA service 190 indicating that a mobile unit has been added to the polling list. The multi-agency router passes this information to the load services. The load service in turn updates its table and changes the multi-agency router table.
3. DeleteNotification_Msg. This message is sent from the RNC/TDMA service 190 indicating that a mobile unit 110 has been removed from its polling list. The multi-agency router 200 passes this information to the load service 220. The load service 220 in turn updates its table and changes the multi-agency router table 350.
4. ChannelRequest_Msg. This message comes to the multi-agency router 200 from the mobile unit 110 and is passed to the load service 220.
5. Polling List Broadcast. This is the current polling list from a given RNC/TDMA service 190. This information is passed to the load service 220 and stored in the database 160.
6. MAR to MAR Messages. These are event notification messages when something changes in a local dynamic table 360. This message type is used to keep primary and backup multi-channel communications systems in sync.
7. PollingRateChange_Msg. This message is generated by the load service 220 and sent to the RNC/TDMA service 190 to change polling rate.

Figure 5:
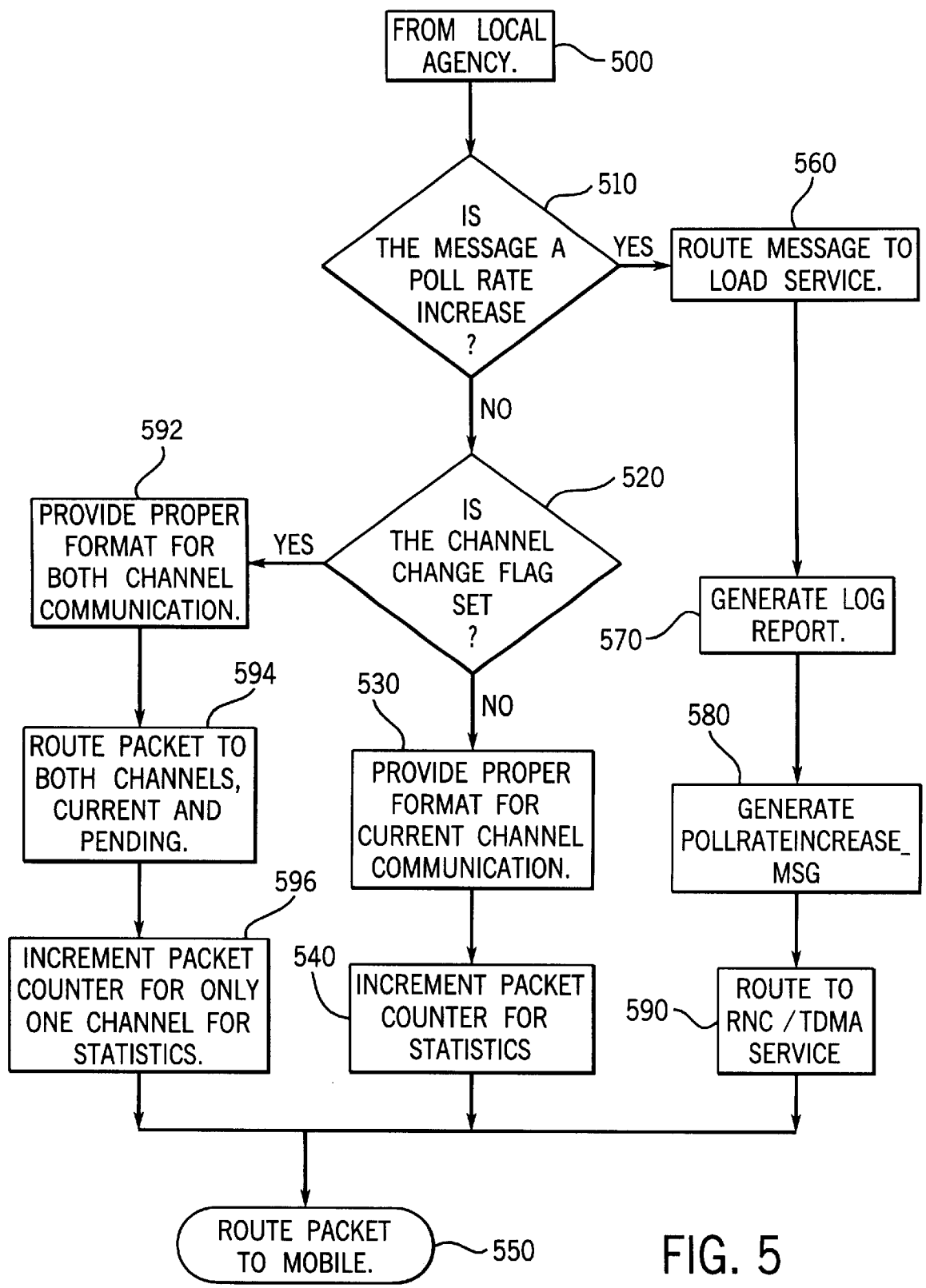
FIG. 5 is a flow diagram showing the dispatch agency to mobile unit routing function performed by the multi-agency router.

Referring now to FIG. 5, the multi-agency router functions in routing messages from a dispatch agency 140 to a mobile unit 110 are shown. The multi-agency router message router 320 in FIG. 3 first determines that a message is from a local dispatch agency 140 (step 500). The message is then checked to see if it is a request to increase the TDMA polling rate (step 510). If no polling rate change is requested, the message router 320 then checks the multi-agency router table 350 to see if the channel change flag is set at step 520. If not the message router 320 then provides for the proper communications format for the selected channel (step 530) as shown in the multi-agency router table 350. The packet counter is incremented for channel statistics as a measure of the usage of a given communications channel (step 540) and the message is then routed to the proper mobile unit 110 (step 550). If at step 510 it is determined that a poll rate increase has been received, the message is routed to the load service 220 (step 560), a log report is generated (step 570), and a PollRateIncrease_Msg is generated (step 580) and sent to the RNC/TDMA service 190 at step 590. If at step 520 it is determined that the channel change flag is set, the store and forward function 310 in FIG. 3 performs the steps 594 and 596 in FIG. 5 and stores the message until the mobile unit is on the new channel.

When a mobile unit 110 is changing channels it is the multi-agency router's 200 responsibility to insure no data packets are missed. The function of reporting disconnects of mobile units 110 also comes from the multi-agency router 200.

Several computers on the multi-channel communications system 100 may be running the multi-channel controller software to provide system redundancy. Being redundant the multi-agency router 200 shares its run time data with other multi-agency routers and load services on the network. This is done mainly on an event driven basis, meaning when an anomaly is found it is handled in such a manner that the truth be discovered and shared through out the system. An example of this would be during the current channel field check, if this is found to be incorrect the multi-agency router 200 sends a message to all other multi-agency routers and load services. In addition to the event driven situations, the multi-agency router table 350 is periodically shared with the other multi-agency router services to verify that all multi-agency router tables on the network are indeed in sync. This broadcasting of the dynamic table is configured for a pre-determined time, and the broadcast message is an internal control message recognized by the multi-agency routers 350 as a table update.

Figure 6:
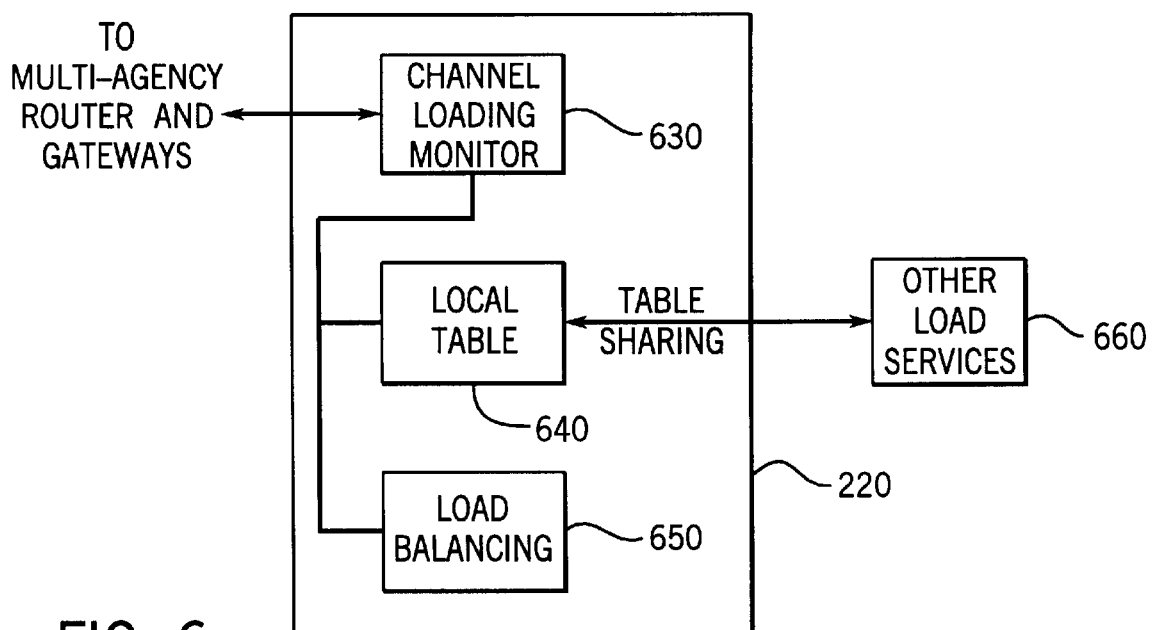
FIG. 6 is a block diagram of the load service functions of the multi-channel controller of FIG. 2.

The load service 220 in FIG. 2 performs the channel monitoring and load balancing functions of the multi-channel controller 130. The load service 220, shown in block diagram form in FIG. 6, has three major functional software elements, a channel loading monitor 630, a local table for TDMA polling list storage 640, and a channel load balancing function 650.

The channel loading monitor 630 constantly monitors the communications channels for an overload condition. The term overload is not indicative of the actual channel capacity due to the fact that the channels are configured with a trigger point that defines overload. For example, the trigger point can be set for a channel to 200 mobile units when in fact there could be enough time slots to efficiently handle 300 mobile units. This channel would be in an overload condition once the threshold of 200 was met.

The load service 220 like the multi-agency router 200 has a local dynamic data table 640 to make load service decisions. The local table 640 contains all of the information for all the channels the load service 220 is responsible for. For example in Table 4 the data needed for channel one is shown. The channel field of Table 4 is the channel that the data is associated with. The status field is the GO/NOGO flag of the channel. The site/group field identifies tower sites 120 and 170. This field is used to determine inter and intra tower site relationships so that the mobile unit can access the loading of a tower site by summing the loads of all channels collocated at that site. The load metric field is the current loading of the channel. In this example the channel is at 50% of its overload condition. The polling list location field points to the location of this channel's current polling table shown in Table 5. The load service 220 supplies this to the RNC/TDMA service 190 in a failure condition. The poll rate field contains a list of the mobile unit's polling rates. The load service 220 uses this information to calculate its loading metric. In this example mobile unit 2049 is operating at the high polling rate.

TABLE 4

| Channel | Status | Site/ Group | Load Metric | Polling list Location |
|---|---|---|---|---|
| 1 | 1 | 3 | 50% | A pointer to the Current Polling list Table 5. |

TABLE 5

Poll Rate

| Mobile ID | Poll Rate |
|---|---|
| 2049 | High |

The load service 220 generates and responds to load service specific activities. The descriptions of the control messages related to the load service are as follows:

1. Loading_Msg. This message is generated from the load service 220 and is broadcast to all mobiles units 110. This message is packaged with the current loading and GO/NOGO information. This information is a percentage that indicates the loading of a channel.
2. Reply_Msg. This message is in response to the mobiles unit's RequestChannel_Msg. This message includes the current Loading_Msg information.
3. Deny_Msg. This message is generated when a mobile unit 110 requests a channel at a tower site 120 with only one channel that has a status of NOGO. This message includes the current Loading_Msg information.
4. CommandChange_Msg. This message is sent during the passive and active load balancing functions. If the load service 220 determines that a mobile unit 110 must be moved to a channel at the same tower site 120, it generates this message to command the mobile unit 110 to the new channel. The mobile unit 110 does not examine this command it simply changes to this channel. This message includes the current Loading_Msg information.

Load balancing operations are based on channels on the same tower site 120 and 170. The load service 220 determines which channels are on the same tower site 120 and 170 by the site/group field. The loading of the channel is constantly monitored and a loading metric is calculated from the amount of mobile units 110 and poll rates of those mobile units 110. This metric is shared with the mobile units 110 in the form of the Loading_Msg. This Loading_Msg is used to inform the mobile units 110 about the loading of the TDMA channels of the multi-channel communications system 100. There are two types of balancing, passive and active. Passive balancing is done when a channel is determined to be in an overloaded condition as mobile units 110 come onto the network. Active balancing is done as a result of a poll rate increase or a failure condition.

The term passive balancing indicates the balancing of the loading of mobile units 110 as they come onto the network. During normal operation the load service 220 looks at the loading of the channel as mobile units 110 are placed there by the RNC/TDMA service 190, via the AddNotification_Msg through the channel loading monitor function 630. When an overload condition is reached the load service 220 will determine if there is an alternate channel at the current tower site 120 or 170 that has a better loading metric. If another channel is available the load service 220 generates a CommandChange_Msg. This message is sent to the mobile unit 110 to command it to the new channel. The load service 220 allows the mobile unit to stay on its current channel if there is no available channel. As an example of the load balancing operation, a tower site 120 has three channels available that are near 0% loaded. Each channel is configured to overload at 80 mobile units. During a peak log on period 160 mobile units attempt to start on channel 1. The load service 220 will not move any mobile units 110 from the first channel until the overload condition is reached. When the channel 1 overload condition is reached, the load service 220 will start to send CommandChange_Msg to the remaining 80 mobile units 110 balancing them on the other two channels.

The term active balancing is when the load service 220 is balancing the channels due to a failure or poll rate increase. If a mobile unit poll rate is increased, it is equivalent to adding additional mobile units 110 to a channel. When this condition occurs, the load service 220 evaluates the other available channels at the current tower site 120 or 170 and moves mobile units 110 to these channels. If a channel fails the mobile units 110 are moved to other channels in a similar fashion. This active balancing is performed by use of the CommandChange_Msg. An example of active load balancing is described in conjunction with FIG. 13.

Being redundant the load service 220 must share its run time data with other load services 660 on the network. This is done mainly on an event driven basis meaning when a change occurs the table is shared through out the system. An example of this is during a poll rate increase when the load service 220 sends a message to all other load services 660. In addition to the event driven situations the load service tables 640 are periodically shared with the other load services 660 to verify that all load service tables on the network are indeed in sync. This broadcasting of the load service table is configured for a predetermined time and the broadcast message is an internal control message recognized by the load service 220 as a table update.

Tower Sites

Figure 7:
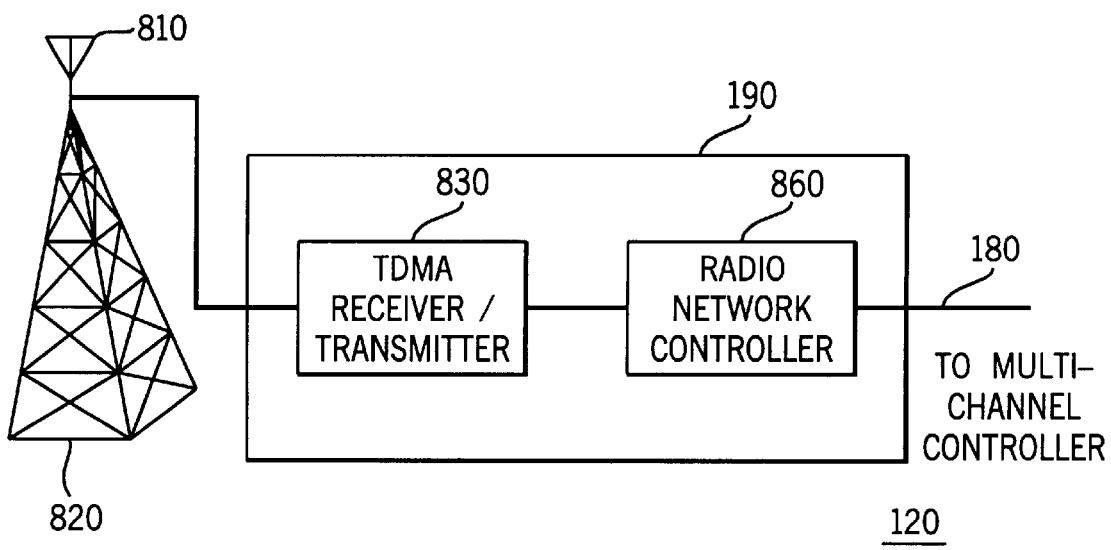
FIG. 7 is a block diagram of a tower site of the multi-channel communications system of FIG. 1.

The RNC/TDMA service 190 provides several functions to support the multi-channel communications system 100 at the tower sites 120 as shown in FIG. 7. The RNC/TDMA service may also be used at a tower site with single channel towers such as tower site 170 (not shown). The RNC/TDMA service 190 consists of the TDMA radio equipment that includes an antenna 810 mounted on the tower 820 and a receiver/transmitter 830. The radio network controller (RNC) 860 is a computer whose software controls the radio equipment and provides the interface between the mobile units 110 and the multi-channel controller (MCC) 130. The RNC 860 is connected to the multi-channel controller 130 through a dedicated connection 180 such as a telephone line or a microwave link. In a fully redundant configuration, two connections 180, primary and secondary, are provided to the RNC/TDMA service 190. The radio network controller 860 automatically adds new mobile units 110 when the mobile units 110 log on and notifies the multi-channel controller 130. The radio network controller 860 computes channel loading and message statistics and forwards the information to the multi-channel controller 130 and processes requests from the multi-channel controller 130. The radio network controller 860 adds mobile units 110 during handoff and removes mobile units 110 during handoff and logoff from one tower site 120 or 170 to another. Polling rate change requests from the multi-channel controller 130 are processed by the radio network controller 860. The radio network controller 860 replaces polling tables and dumps loading and statistics when requested by the multi-channel controller 130. The radio network controller 860 requests and/or synchronizes primary and secondary TDMA polling tables and automatically reconfigures the multi-channel controller connection during failures.

In certain cases it is necessary to extend geographic coverage, increase capacity at peak loading or increase reliability of the multi-channel communications system 100 with a backup through the use of mixed or alternate communication systems or methods. In such instances, one system is designated as the primary. The various communications systems or methods supported by multi-channel communications system 100 can be divided into two groups, demand based systems and exception based systems. Demand based communications systems are those that supply a channel for communications upon demand by the user. Exception base communications systems are those that allow communications by a user when a channel becomes available. Table 6 below lists some of the communications systems that are supported by the multi-channel communications system 100.

TABLE 6

| Comm System | Type |
|---|---|
| TDMA | Demand |
| EDACS | Exception |
| AMPS Cellular | Exception |
| CDPD | Exception |
| RAM Mobile Data | Exception |
| Wireless LAN | Demand |
| Digital Cellular | Exception |

These various communications systems can be logically grouped into candidate primary and secondary systems for different users. In addition, default or fallback conditions may not occur in all systems. Included are logical choices for default conditions in these systems. Default conditions usually apply to the voice fallback mode. In some systems it is possible to have no default mode. Table 7 lists examples of primary, secondary, and default system choices for users of the multi-channel communications system 100. For example in the first line of Table 7, the RNC/TDMA service is the primary choice and when loading and geographical limitations require, the user switches to the secondary AMPS cellular system and then to the default system of conventional voice.

TABLE 7

| Primary | Secondary | Default |
|---|---|---|
| TDMA | AMPS Cellular | Conventional Voice |
| TDMA | EDACS Data | EDACS voice |
| TDMA | Digital Cellular Data | Digital Cellular Voice |
| CDPD | AMPS Cellular | AMPS Voice |

Interaction is required between the multi-channel controller 130 and the RNC/TDMA services 190 to manage polling lists and to maintain information about current polling rates of individual mobile units 110. The messages used to provide these interaction capabilities are listed below.

1. AddNotification. A control message sent from the RNC/TDMA service 190 to the load service 220 when a new mobile unit 110 is added to the polling roster of the TDMA service.
2. AddToTDMA. A control message sent to the RNC/TDMA service 190 from the load service 220 to add a mobile unit 110 to the polling list.
3. DeleteFromTDMA. A control message sent to the RNC/TDMA service 190 from the load service 220 to delete a mobile unit 110 from the polling list.
4. RqstPollList. A control message sent to the RNC/TDMA service 190 requesting the current polling list.
5. CurrentPollList. A control message sent from the RNC/TDMA service 190 in response to a request for current polling list and contains the current polling list of the RNC/TDMA service 190.
6. ReplacePollList. A control message sent to the RNC/TDMA service 190 that contains a saved version of a previous polling list that is to be installed as the current working polling list.
7. ModPollRate. A control message used to change the polling rate of a mobile unit 110 or group of mobile units 110.
8. ReqStats. A control message sent to the RNC/TDMA service 190 from the multi-channel controller 130 requesting all RF network statistics collected by the radio network controller 860. The data file size may be limited by a date or time range or be all saved data. Care must be exercised as to when this command is executed because the statistics data transfer may saturate the communication link between the multi-channel controller 130 and radio network controller 860.
9. StatsUpdate. A control message from the RNC/TDMA service 190 containing the statistical data from the radio network controller 860.

A polling rate is associated with each mobile unit 110 and is included as part of the above control messages. The multi-channel controller 130 contains the master polling lists that are saved on a regular basis from each of the RNC/TDMA services 190. These lists are used to re-initialize the RNC/TDMA service 190 during a temporary dropout of the service.

Mobile Units

Figure 8:
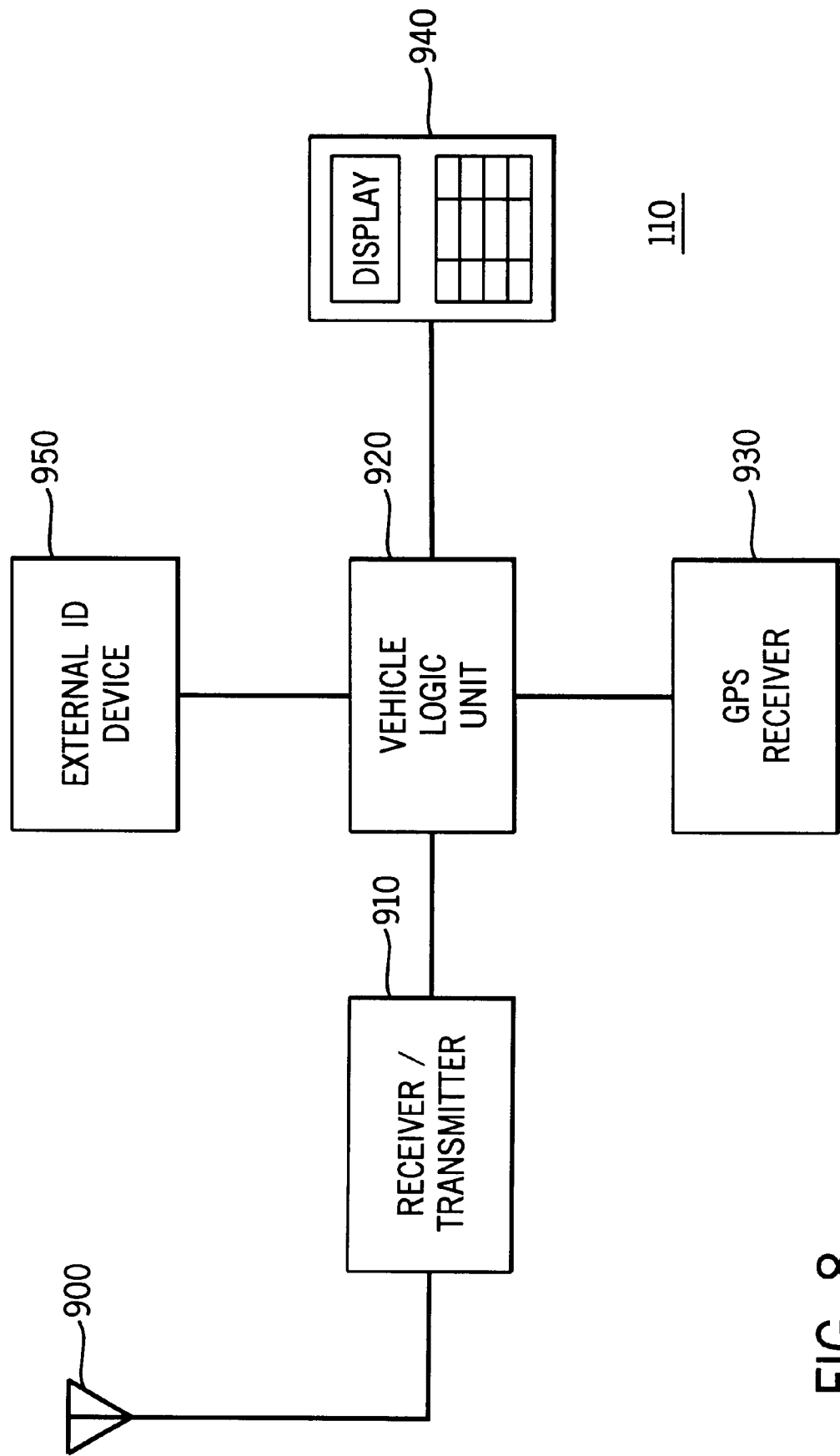
FIG. 8 is a block diagram of a mobile unit in the multi-channel communications system of FIG. 1 showing the various elements included in the mobile unit.

The mobile units 110 in FIG. 1 are tightly integrated with the multi-channel controller 130. The mobile unit 110 block diagram is shown in FIG. 8. Included in the mobile units 110 is radio equipment such as an antenna 900 and a receiver/transmitter 910 appropriate to the communications methods and channels employed, a vehicle logic unit (VLU) 920 for control and interfacing in the multi-channel communications system 100, a global positioning system (GPS) receiver 930 for location determination, and a display and keypad 940 for reading and loading data.

The vehicle logic unit 920 software performs several functions in control of the radio equipment and interfacing with the multi-channel controller 130. These include mobile unit ID to IP mapping, power up, log on search, and handoff.

Each mobile unit 110 supplies a static identifier in order to marry the hardware with the mobile unit. This is can be done by an external ID device 950 that supplies a static identifier (ID) that can be queried within the firmware. This method is the most logical because the ID is in fact married to the vehicle. The ID can also be manually entered from the keypad 940.

The mobile units 110 have at least two identifiers to participate in the multi-channel communication system 100, an ID for TDMA and an IP for the alternate communications methods. These two identifiers are derived from the static identifier. The static identifier is broken into two parts, the network ID and the node ID. The current message structure of the mobile unit ID is set at 16 bits. As an example, this is broken into two parts, 5 bits for a network ID and 11 bits for the unique identifier. This will give the capability of 30 mobile unit domains with 2047 clients per domain (61,410 vehicles). The domains give the adaptability to group or categorize the entire RF network. The infrastructure also requires two predetermined values, the subnet mask and LAN network address. The subnet mask is calculated per RFC 950 of the Internet Control Message Protocol and the LAN network address is the same used on the multi-channel controller subnet. The amount of bits used for this mask is configurable to allow the customization of the amount of dispatch agencies and mobile units per dispatch agency. The subnet mask reflects this configurable bit to insure the TCP/IP subnet mask is accurate. These values are passed via a system message to insure the mobile units 110 are using the same parameters when calculating the network and ID. The following is an example of the software logic operations to accomplish this task with the mask bit set at 5:

LAN network address=32 bits=191.128.x.x

Subnet mask=32 bits=255.255.248.0 (This results in 30 mobile unit domains and 2047 nodes)

Mobile unit ID=16 bits=00001.000 00000001=8.1 (5 bits for the subnet and 11 bits for node address)

1. Enter predetermined LAN network address in to the 4th and 3rd octets in the IP address:

10111111.10000000.xxxxxyyy.yyyyyyy= 191.128.x.x

2. Put the 5 bits into the high order bits of the 2nd octet of the IP address:

10111111.10000000.00001yyy.yyyyyyy= 191.128.8.x

3. Put the 11 bits into the low order bits of the IP address to complete the IP address:

10111111.10000000.00001000.00000001= 191.128.8.1

4. The IP Address is 191.128.8.1

Figure 9:
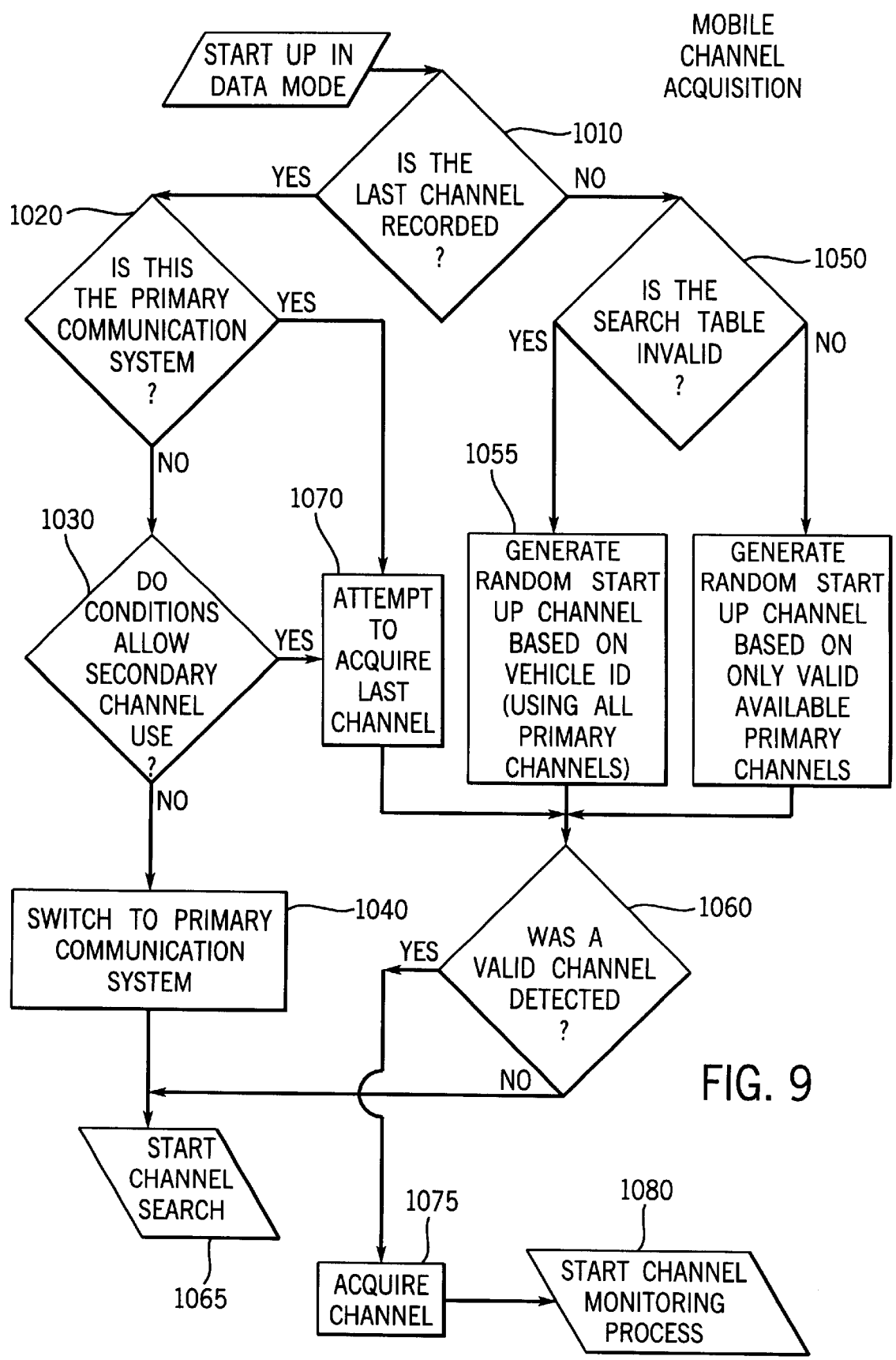
FIG. 9 is a flow diagram showing mobile unit channel acquisition function performed by the vehicular logic unit contained in the mobile unit of FIG. 8.

FIG. 9 shows mobile unit 110 channel acquisition on power up. At power up, the vehicle logic unit 920 attempts to logon to the multi-channel communications system 100. The vehicle logic unit 920 tries to use the last communication channel used before shut down (step 1010). This channel may be the primary or secondary communication system (step 1020). If the last channel recorded is used and it is the primary communications system, the vehicle logic unit 920 attempts to acquire this last channel (step 1070). Depending on the types of systems in use, the vehicle logic unit 920 may be required to switch back to the primary system and search before logging on (steps 1030, 1040, and 1065). If the data communications channel used is TDMA and there is no last channel information, the vehicle logic unit 920 logs on to a pseudo-randomly selected channel based on the mobile unit ID (step 1050 and 1055). The vehicle logic unit 920 starts into its search algorithm if there is no activity on this selected channel after a predetermined amount of time (step 1060 and 1065). The start channel search 1065 enters the search shown in FIG. 10b at step 1130. If after detection of a valid channel is made (step 1060), the channel is acquired and the monitoring process is started (steps 1075 and 1080). After exhausting all possible channels, the vehicle logic unit 920 goes to another communication system or into voice fallback (not shown on FIG. 9).

Figure 10A:
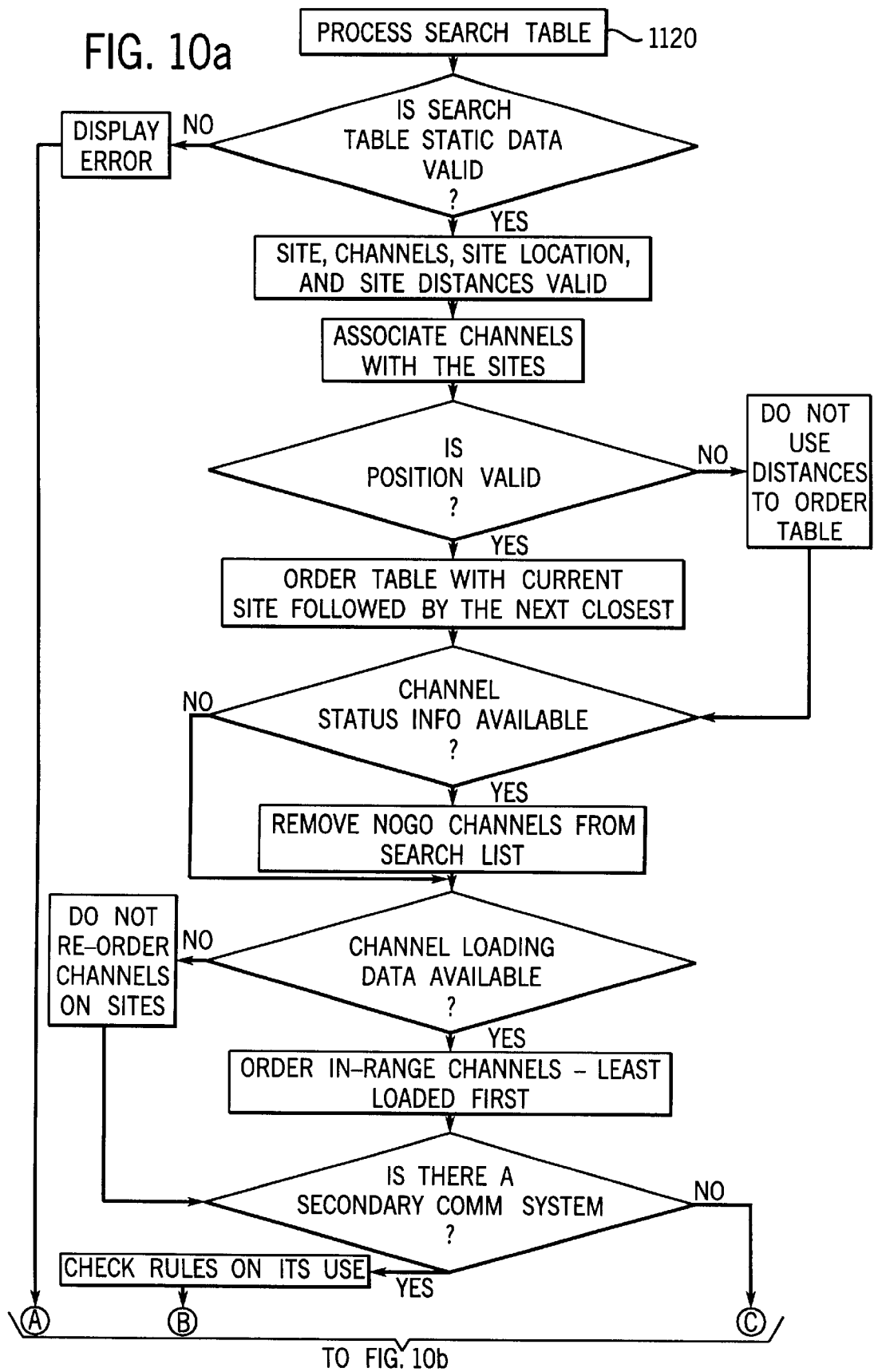
FIGS. 10a and 10b are flow charts of the mobile unit's vehicle logic unit search function to find a new communications channel.
Figure 10B:
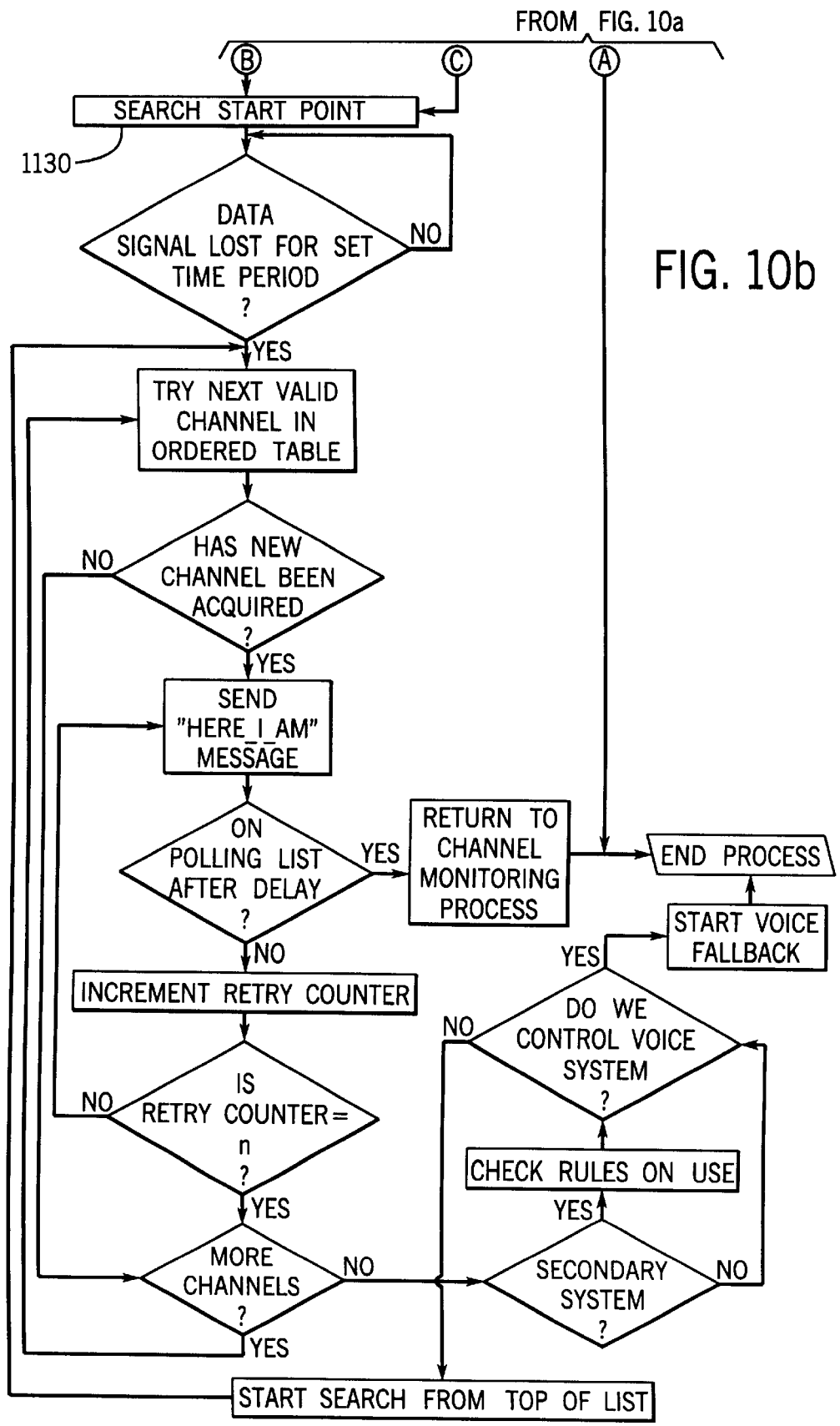

The search is conducted if a valid channel is not found after power up or a channel fails. FIGS. 10a and 10b show the vehicle logic unit search flow chart. The vehicle logic unit 920 contains a table of available channels used during search as shown in Table 8. This search table contains the data used in determining the order in which the channels are searched. The search table processing steps start at the Process Search Table (step 1120). The search starts at Search Start Point (step 1130).

The data the vehicle logic unit 920 has available for constructing the search table include static data on tower sites 120 and 170 such as geographic positions, signal ranges, and channel configurations. The vehicle logic unit 920 also receives information from the multi-channel controller 130 such as channel status and channel loading. The vehicle logic unit 920 calculates its current position and the distance to the tower sites using GPS information. In addition, the vehicle logic unit 920 stores information such as it current channel, the last channel it used, the last position of the mobile unit 110, and the primary and secondary communication systems available to the mobile unit 110.

When the vehicle logic unit 920 is powered up for the first time, the only information in the search table is tower site 120 and 170 position, signal range, and configuration. The vehicle logic unit 920 has no stored information and it is likely that the GPS receiver has not yet acquired a position. The vehicle logic unit 920 randomly selects a channel from the table. If there is no activity, a round robin search approach is used.

When a multi-channel controller loading message is received, the vehicle logic unit search table is updated with loading and status information for each channel. Any channel that is flagged as NOGO will be removed from the search list. The percent of loading on a channel may be much greater that 100% in times of channel failure or if polling rates have been increased on many mobile units 110.

When GPS position becomes valid or if the last position is stored, the search is based on the distance from the tower sites 120 or 170 and the tower site channel range. The search is reordered from best site to worst. Unreachable sites are not searched. At a normal vehicle logic unit power down, GPS position is saved for use at the next power up to determine the distance to the tower sites 120 and 170. After a successful channel change, the current channel is saved as the last channel to begin the search from.

The vehicle logic unit 920 randomizes its use of contention slot "Here I Am" messages to avoid all the mobile units 110 trying to log on a new channel during a channel failure.

If the vehicle logic unit 920 sends a predetermined number of "Here I Am" messages without getting on the polling list, it is assumed that the link is bad and the vehicle logic unit 920 continues searching or goes into the voice fallback mode if the search list is exhausted.

There is significant time involved with most radio channel changes. Most radios allow sequential channel changing with 0.25 to 0.5 seconds per iteration. The search algorithm assures that in fallback mode voice communication is not lost for long periods of time.

TABLE 8

| Channel | Location | Signal Range | Status | Loading | Distance |
|---------|----------|--------------|--------|---------|----------|
| 1 | Lat/Long | Miles | GO/NOGO | Percent | From Vehicle |
| 2 | | | | | |
| 3 | | | | | |
| 4 | | | | | |

Figure 11B:
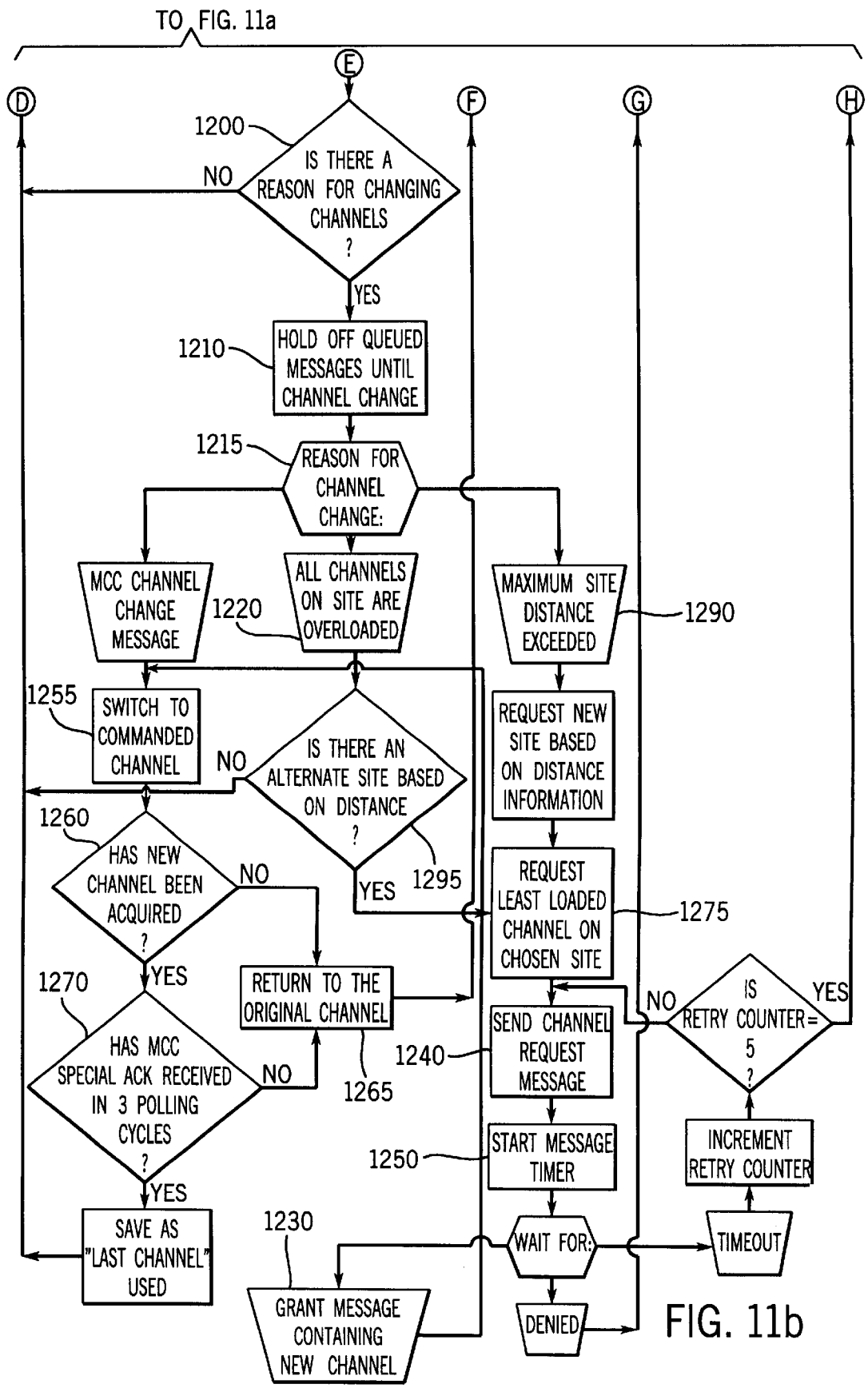

FIGS. 11a–11b are flow charts of the mobile unit vehicle logic unit channel monitoring and tower site and channel changing functions. The vehicle logic unit 920 performs the handoff operation of the mobile unit 110 between tower sites 120 and 170. The vehicle logic unit 920 sends a channel request message (step 1240) and waits for a channel reply message (step 1250). If the channel is granted, the vehicle logic unit 920 changes to the new channel (step 1255) noted in the grant message (step 1230). Several conditions may exist on the new channel. The mobile unit 110 may not be able to hear the new channel (step 1260). In this case, the vehicle logic unit 920 returns to the original channel after a preset time (step 1265). The mobile unit's signal might not reach the new tower site. The vehicle logic unit 920 would not detect this until dropped from the polling list. To avoid this condition, the multi-channel controller 130 sends a special acknowledge message (step 1270) when it detects the mobile unit 110 on the new channel. The vehicle logic unit 920 waits the equivalent of some selectable multiple of normal polling times to receive this message before reverting back to the original channel (step 1265).

The vehicle logic unit 920 requests the least loaded channel on the requested tower site 120 or 170 (step 1275), based on the information contained in the multi-channel controller loading message stored in the vehicle logic unit search table (step 1280). The multi-channel controller 130 may grant this channel (step 1230) or select a different channel based on current information. The grant message also contains channel status and loading information for the search table (Table 8).

The normal condition for a change of tower sites 120 and 170 is based on distance from the tower sites (step 1290). The vehicle logic unit 920 maintains a pseudo signal strength derived from these distances (step 1285). This pseudo signal strength is determined by using the GPS receiver 930 of FIG. 8 to determine location of the mobile unit 110. The locations of the tower sites 120 and 170 are fixed and known to all mobile units 110. The distance to a tower site 120 and 170 is determined from the mobile unit and tower site locations. As distance from a tower site increases, the signal strength decreases. In this manner, the distance is used to derive a pseudo signal strength.

Site loading may force mobile units 110 onto another tower site 120 or 170 (step 1220). The vehicle logic unit 920 contains the information needed to determine if this jump is possible. As tower site loading increases, mobile units 110 farther from the tower site 120 and 170 jump to another available site (step 1295). The multi-channel controller 130 guards against overload conditions limiting the number of mobile units 110 changing tower sites 120 and 170 at one time (step 1275). Queued messages are not transmitted until the handoff process is complete (step 1210).

MCC System Operation

Figure 12:
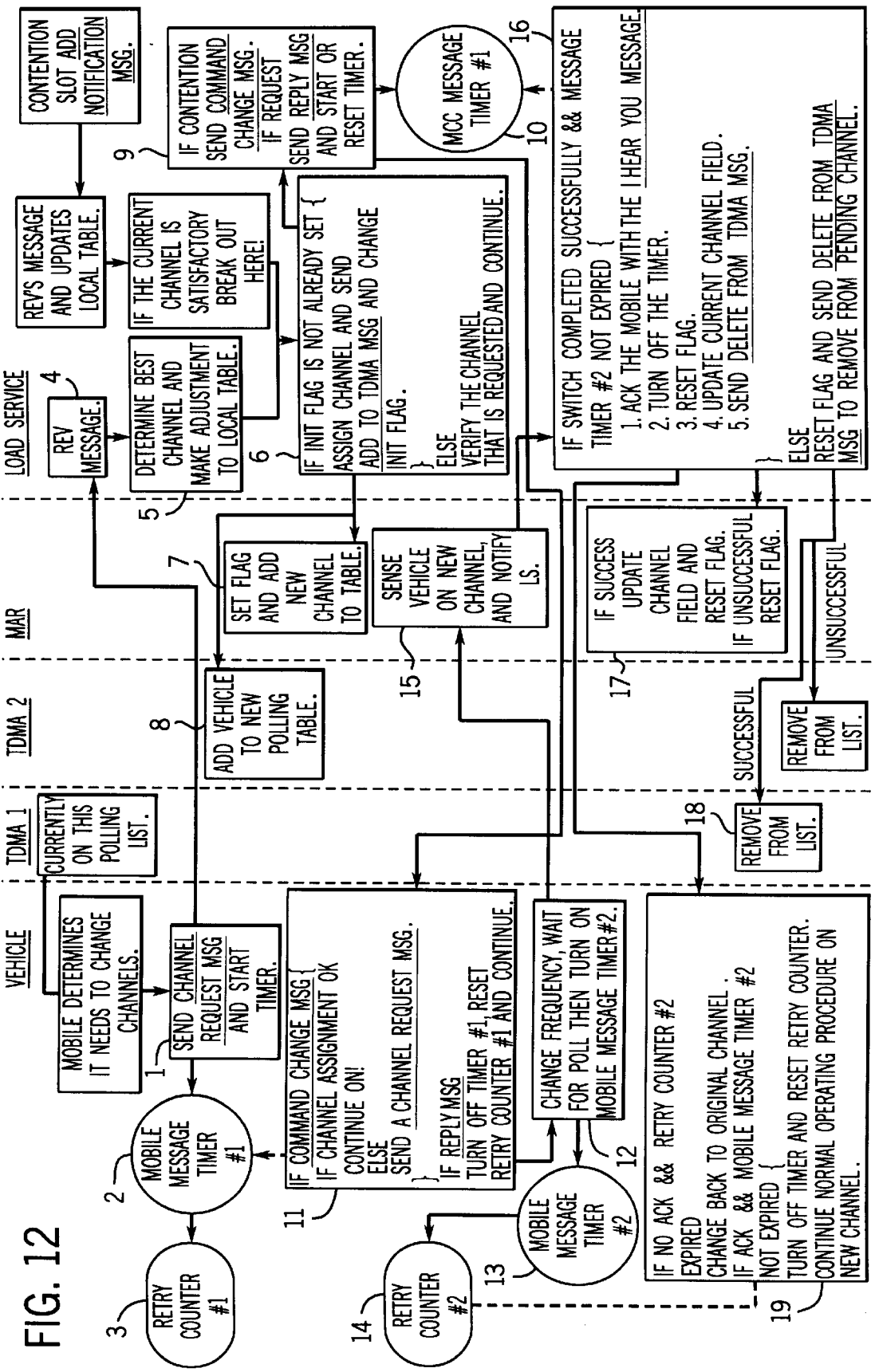
FIG. 12 is a flow chart of the multi-channel communications system operation during a mobile unit's channel change request.

The operation of the multi-channel communications system 100 is shown through examples of the software operation. The multi-channel communications system operations software walk-through shown in FIG. 12 is based on a successful ChannelRequest_Msg sent from a mobile unit 110 The numbered paragraphs in the walk-through correspond to the numbered blocks on the flow chart, as show in FIG. 12. The headings across the top of the figure show where each function in the flow chart occurs. For example under the load service all functions below that heading such as number 4, 5, 6, etc. occur in the multi-channel controller load service 220.

Mobile Unit Channel Change Request Software Walk Through

1. Mobile unit 110 sends ChannelRequest_Msg and starts the Mobile Message Timer #1. This is a message that comes in as a normal multi-channel controller system message.
2. Mobile Message Timer #1, this is the amount of time it takes for the message to travel through the multi-channel controller 130 and the reply to get back to the mobile unit 110.
3. Retry Counter #1 is a counter that keeps track of how many times the mobile unit 110 will retry the ChannelRequest_Msg if a reply from the multi-channel controller 130 isn't received. Once expired the mobile unit 110 will not try to change again and will continue on this channel until eventual loss of signal. This will force the mobile unit 110 back on a channel via a contention slot.
4. The load service 220 receives this request.
5. The load service 220 looks at the requested channel and determines if it is acceptable. Acceptable means that if the requested channel is not flagged as Status Fail or in an overloaded situation. If a Status Fail was detected a Deny message would be generated. The load service 220 could change the requested channel to an alternate channel at that same site if the alternate channel has a better metric. The metric is a measure of the RNC/TDMA service 190 and used by the load service 220 to make is decisions on system loading.
6. The load service 220 looks at the Channel Change Flag in multi-agency router 200 Table 9 below to determine if this is a retry from the mobile unit 110. If the Channel Change Flag is not set the load service 220 will add the channel to all the multi-agency router tables 350 (all multi-agency routers on the network) and set the Channel Change Flag. It also at this time sends the AddToTDMA_Msg to the new channels. RNC/TDMA service 190 adds the mobile unit 110 to the new polling list and allows for a soft transition to the new channel. If the Channel Change Flag is already set the load service 220 verifies that the channel requested is the same as in the new channel field in the multi-agency router table 350. If the requested channel is different than the previously requested channel, the multi-agency router table 350 is updated with this current information.
7. The multi-agency router table 350 is updated by the load service 220 to indicate the channel switch as shown in Table 9.
8. The mobile unit 110 is added to the polling list of the new channel.
9. The Reply message is generated and sent to the mobile unit 110. Any message generated in this box also has the Loading Status information in it. The MCC Message Timer #1 is also set or reset. It is reset is to ensure that the total duration of this timer is available when a message is sent.

10. MCC Message Timer #1 is set for a predetermined number of polling cycles. This number results in the amount of time it may take for the mobile unit 110 to show up on the new channel as sniffed by the multi-agency router packet sniffing function 340.

11. The mobile unit 110 receives the Reply message. This message arrives in the window of Mobile Message Timer #1. The Mobile Message Timer #1 is shutdown and the Retry Counter #1 is reset.

12. The mobile unit 110 switches the radio to the new channel and starts the Mobile Message Timer #2 when the first poll is heard.

13. The Mobile Message Timer #2 is the amount of time between the mobile unit's transmit and the receipt of the ACK from the multi-channel controller 130 (IHearYou_Msg).

14. The Retry Counter #2 is the number of polls the mobile unit 110 will respond to while waiting for an ACK (this count<MCC Message Timer #1).

15. The multi-agency router 130 senses that the mobile unit 110 has made it to the new channel. This is accomplished by sniffing the messages it is receiving. The multi-agency router 200 then notifies the load service 220 that the switch has completed successfully.

16. The load service 220 receives the notification from the multi-agency router 200 and checks to see if the MCC Timer #1 has expired, if not the load service 220 sends out the IHearYou_Msg to the mobile. The load service 220 then performs some housekeeping functions such as; turning off the MCC MSG Timer #1, resetting the Channel Change Flag, updating the current channel field in the multi-agency router table 350, and then removing the mobile unit 110 from the previous TDMA polling list.

17. The multi-agency router table 350 is updated.

18. The mobile unit 110 is removed from the previous channel.

19. The mobile unit 110 receives the ACK (IHhearYou_Msg) from the multi-channel controller 130 and resets the Retry Counter #2 and Mobile Message Timer #2. The mobile unit 110 continues on its new channel under normal operating conditions.

Channel Overload and Failure Condition Operation

The TDMA channels are sized to effectively support a maximum number of mobile units 110 per channel based on several factors such as the polling rate required by the dispatch agencies 140, the polling rate required under emergency conditions, peak loading traffic on the channel, the number of contention slots in use during peak periods, and the number of contention slots available per frame.

These factors determine the number of mobile units 110 that can be supported under normal conditions while maintaining relatively timely throughput of messages to and from the mobile units. When this condition is exceeded the channel is considered in an overload condition. When an overload condition exists on one or several of the channels at a given tower site 120 or 170 being utilized by the multi-channel controller 130 (intra-site), the multi-channel controller 130 will attempt to alleviate this condition.

Factors contributing to an overload condition are an increase in polling rate for a mobile unit 110 or group of mobile units automatically or by a dispatch agency 140, addition of a mobile unit to a particular channel, and channel failure and the resulting load shifted to other channels.

Since the multi-channel controller 130 has no knowledge of the location of the mobile units 110, overload compensation is only performed between channels at the same tower site 120 or 170. Channels at the same tower site 120 or 170 have approximately the same coverage and maximize the chances of a successful channel switch. In the event that all channels at the common site are overloaded, no attempt is made to load level by the multi-channel controller directly. Mobile units 110 may decide to switch tower sites on their own. The overload condition will be allowed to exist.

Passive load balancing will not occur until channel limit settings are exceeded. These limits are part of the configuration settings of the multi-channel controller 130 done through the user interface 150 (FIG. 1). The limit settings are configurable on a per channel basis. Also channels common to each tower site are identified as part of the initial configuration of the multi-channel controller 130.

Figure 13:
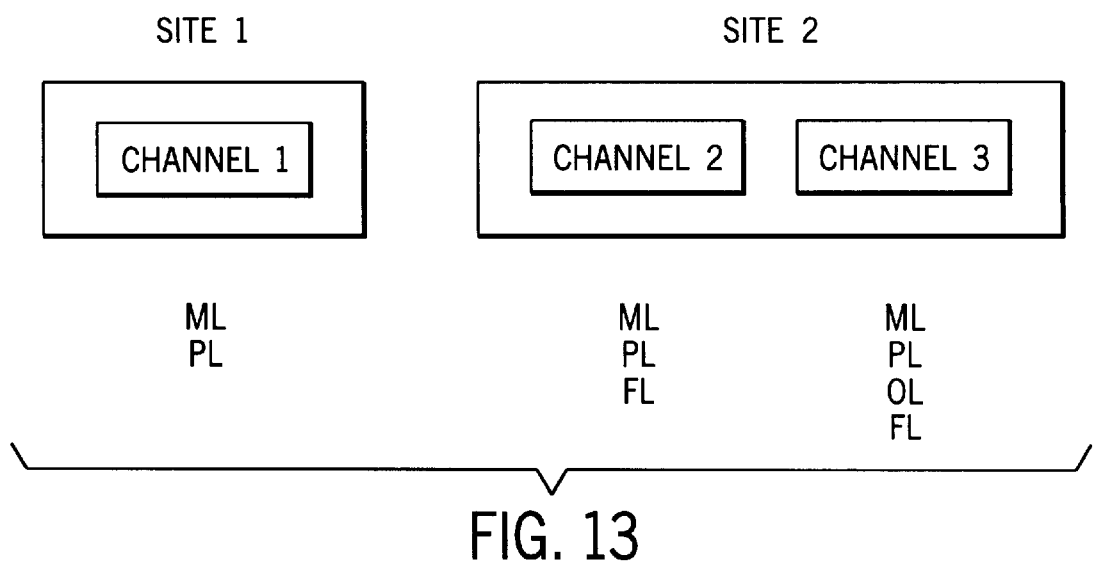
FIG. 13 is diagram of the multi-channel communications system operation during channel overload conditions due to mobile unit loading.

Referring now to FIG. 13 for discussion of load balancing examples. In the first example, overloading is due to mobile unit loading. In this example channel 1 and 2 have reserve capacity with a maximum load (ML) of 100 mobile units each and a present load (PL) of 60 on channel 1 and 80 on channel 2. Channel 3 is at maximum capacity with a ML of 100 and a PL of 100. Channel 2 and channel 3 are at the same tower site 120 shown as site 2 in FIG. 13. A mobile unit 110

TABLE 9

| Mobile ID | Current Channel Assignment | New Channel Assignment | Channel Change Flag | Description of events | Flow Chart Number |
|---|---|---|---|---|---|
| 2049 | 1 | X | 0 | Mobile 243 sends a ChannelRequest_Msg for channel 2 | 1,2 |
| 2049 | 1 | 2 | 1 | Load service receives request and determines this channel is acceptable. The load service adds the new channel to the MAR table and sets the Channel Change Flag | 6,7 |
| 2049 | 2 | 2 | 0 | After successful switch the load service updates the MAR table to indicate the new current channel and resets the Channel Change Flag | 16,17 | starts and utilizes its last used channel when shut down the night before and has no or very old channel loading information. After the mobile unit 110 is started, the radio network controller 860 (FIG. 7) associated with channel 3 adds the vehicle to the channel 3 polling list. A message is sent to the multi-channel controller 130 notifying the load service 220 of the additional mobile unit 110 on the polling table of channel 3. The load service 220 recognizes that the ML of channel 3 is exceeded, giving channel 3 an overload (OL) of 101, and that there is sufficient capacity on channel 2 (balancing after overload, above ML threshold setting), a same tower site channel. A channel change message is sent to this mobile unit 110 requesting that the mobile unit 110 utilize channel 2. The mobile unit 110 is added to the RNC polling roster of channel 2. The mobile unit 110 initiates a channel change action over to channel 2. When the multi-channel controller 130 recognizes that the mobile unit 110 is operating on channel 2, the mobile unit 110 is removed from the channel 3 polling roster. The final load (FL) on channel 2 is 81 and 100 on channel 3. If a login sequence is started prior to receiving the channel change command, the login sequence will be completed prior to switching. If the switch has occurred prior to login, login will be completed on channel 2. All mobile units 110 initiated will be queued once the mobile units commence the channel switch sequence and out bound individual messages will then be sent.

The above scenario could also occur as a result of a mobile unit 110 losing communications with channel 1 and attempting to establish communications on channel 3. This is an unlikely situation because the mobile unit 110 should have recent load information from the multi-channel controller if it was in communication prior to the signal outage. The channel load information message is sent to all mobiles units 110 every two to ten minutes. There could be an abrupt change to the channel loading during this period of time due to dispatch agency 140 initiated poll rate changes.

Refer again to FIG. 13 for an example of an overload situation due to polling rate change. In this example channel 1 and 2 have reserve capacity with a ML of 100 on each channel and a PL of 60 on channel 1 and 80 on channel 2. Channel 3 is near maximum capacity with a ML of 100 and a PL of 95. Channel 2 and channel 3 are again at the same tower site. The dispatch agency 140 initiates a poll rate change on ten mobile units 110 on channel 3. The poll rate on ten mobile units 110 is increased to six times per minute from one time per minute. This polling rate increase is equivalent to adding 50 mobile units to the polling list resulting in an OL condition of 145 mobile units on channel 3. In this case, the load service 220 attempts to shift a portion of the mobile units 110 that are at the increased polling rate. This causes the least disruption to the network and minimizes the number of mobile units 110 to be moved. Since each of these mobile units 110 has an equivalent load of six, each mobile unit channel change reduces the load by six on channel 3 and increases the load by six on channel 2. The load service 220 calculates how many mobile units 110 can be moved to channel 2 without causing an overload condition. In this example, three of the high poll rate mobile units 110 are moved. Since the loading is a dynamic situation, the load calculation must be performed as each of the three mobile units 110 is transitioned. The FL for channel 2 is 98 and 127 for channel 3. If during the process a new mobile unit 110 enters channel 3, it is shifted to channel 2 as described in the previous example.

The load service 220 calculates the load values for each of the settings using the normal setting as a value of 1. The other load values are calculated using the rate inputs from the high and low settings for the particular application. The rate values are configurable in the RNC/TDMA service 190 and correspond to those in the load service 220.

The multi-channel controller 130 has a soft failover capability in the event of a failure of any of the data communications channels. The RNC/TDMA service 190 is capable of adding more mobile units 110 than what is considered a 100% load. The RNC/TDMA service 190 will not provide slot assignments as rapidly as required under normal conditions but will continue to provide a reduced capability until repairs are performed on the failed channel. The multi-channel controller 130 monitors the health of all its associated channels and provides input to the mobile units 110 by broadcasting this information as part of the load message.

A channel failure can be the result of failure of several different elements of the remote tower site 120 or 170. Some of these potential failures are failure of the base station transceiver, failure of the radio network controller hardware, failure of the RNC/TDMA service software, failure of the operating system on the RNC 860, failure of the physical link connecting the radio network controller 860 to the remainder of the system, and failure of the software connectivity between the RNC/TDMA service 190 and the multi-channel controller services.

The system is capable of detecting any of the above failures and reporting these failures to the multi-channel controller load service 220 as well as other services and applications utilizing this information. The multi-channel controller 130 utilizes the failure information to notify all mobiles units still operating on other data channels of the channel failure. The status of all channels of the system is included in the load message that is sent out on a regular basis to the mobile units 110. When a channel failure occurs, the load message is immediately sent to the mobile units 110 regardless of the normal update rate. The mobile units 110 utilize this information to determine the order in which they will attempt to change channels when this action is necessary. In this case the remaining mobiles units would no longer attempt to use the failed channel.

There are several possible channel failure scenarios that relate to the topology of the data radio channels in a particular system. and these failures are described graphically. A three-channel situation is used in the two example scenarios described graphically in FIGS. 14 and 15.

Figure 14:
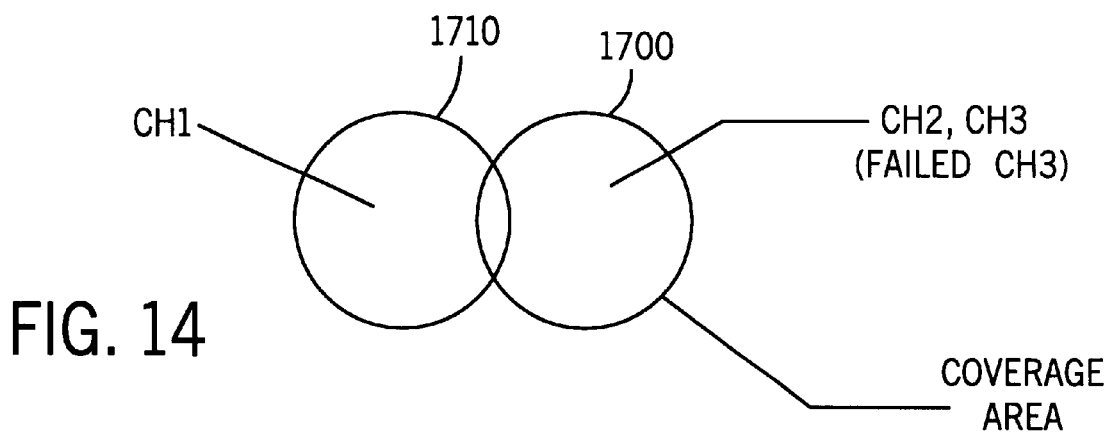
FIG. 14 is a diagram showing multi-channel communications system operation during a channel failure at a multi-channel tower site.

In example one shown in FIG. 14, a channel failure occurs at a multiple channel tower site 1700. In this example, channel 3 has a channel failure. Since the coverage for channel 2 is very nearly the same as channel 3 because they are on the same tower site 1700, all mobile units 110 (FIG. 1) that were operating on channel three will attempt to be placed on channel 2. To assist in this handoff operation, the multi-channel controller 130 adds all mobile units 110 that were operating on channel 3 to the channel 2 polling list. During the failure the multi-channel controller 130 allows for the overload condition on the channel. Therefore the system continues to operate although performance is degraded.

The mobile units 110 have no knowledge of the channel failure, only that communications has been lost with the tower site base station. The mobile units 110, in the event of signal loss for a preset configured period of time, enter into the channel search algorithm as shown in FIGS. 10*a*–10*b*.

The mobile units 110 select the next best channel based upon the last received channel load information message, the distance to the tower site, same tower site channel, and whether the channel is primary or secondary.

Since the majority of mobile units 110 utilizing channel 3 prior to the failure are nearer to the channel 2 tower site 1700 than the channel 1 tower site 1710, the attempt to acquire channel 2 will normally be made. In some cases where mobiles are near the fringe coverage of the channel 3 tower site 1700, acquisition may be attempted on channel 1. When this situation occurs, the multi-channel controller 130 recognizes the event and reconciles the master polling table by removing the mobile from the channel 2 polling table.

Figure 15:
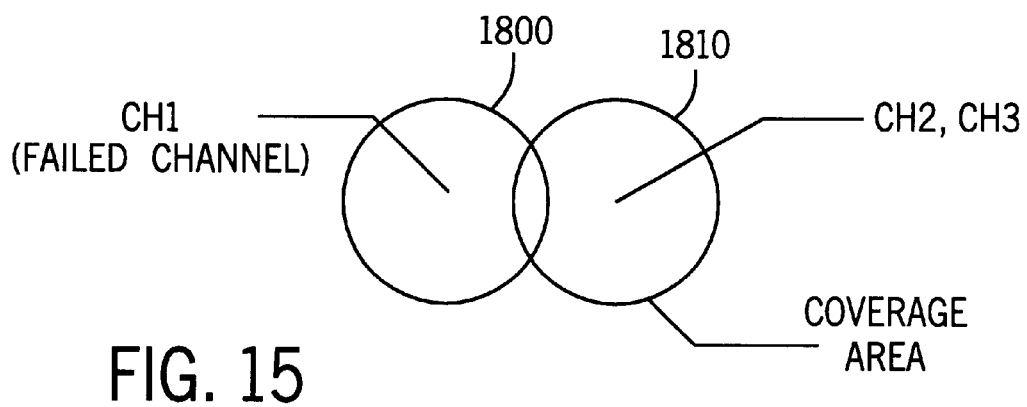
FIG. 15 is a diagram showing multi-channel communications system operation during a channel failure at a single channel tower site.

In example two shown in FIG. 15, a channel failure occurs on channel 1 at a single channel tower site 1800. In this example, channel 1 has a channel failure. Since there is no redundant coverage at this tower site, the multi-channel controller 130 (FIG. 1) will provide no assistance with the channel switch. The multi-channel controller 130 sends the channel load message out to the other mobile units 110 notifying them of the channel failure. All attempts to reestablish communications are initiated by the mobile units 110 based on the channel acquisition tables carried internally in the mobile unit vehicle logic unit 920 (FIG. 8). In this case the number of mobile units 110 that acquire a channel depends on the amount of overlapping coverage between tower sites 1800 and 1810. After all attempts have failed, the mobile units 110 go to the fallback voice mode of operation.

MCC Redundancy Concepts

The redundancy available in the multi-channel controller 130 is in two areas: software and infrastructure computer hardware. These two areas work together to ensure a robust, fail-safe system that eliminates any single point failures at both the software application and data communications level. The multi-channel controller 130 has various levels of redundancy that are configured while still maintaining the integrity of the system. For example, if a redundant physical infrastructure is implemented then the software applications utilize this backup infrastructure during failure situations of the primary infrastructure. Likewise, if redundant software applications are running in parallel then there are alternative logical links (e.g. sockets, pipes, etc. ) to these backup applications that can be utilized during failure of the primary applications. Hardware redundancy is a known technology implemented in many network architectures using standard commercial equipment and techniques. The following paragraphs explain further the concepts of software redundancy.

The software redundancy in the multi-channel controller 130 provides the ability to autonomously detect failures of primary applications, automatically reconfigure backup applications (and any associated communication paths), and to do so in a timely manner that minimizes (or eliminates) loss of data. This is an autonomous action transparent to dispatch agencies and mobile units.

To detect failures, the inter-application connection method (e.g. sockets, pipes, etc) continuously monitors the quality and status of the connection. This mechanism is part of the native connection method used so as to minimize any overhead related to this task. An example of a poor solution to test communications channel quality and status would be to use a ping message within the application to periodically test the communications channels.

Once a failure of a primary application is detected, preprogrammed (user-configurable) logic is put in place to reconfigure communications with a redundant software application that can perform the same multi-channel controller services. This is accomplished through several methods such as having primary and backup software applications or parallel applications. The term reconfigure is used here in the software (not hardware) sense. It takes the form of closing and opening connections (in the case of primary/backup) or denoting a different connection as primary (in the case of parallel).

To perform this in a timely manner that minimizes data loss, communications exist between applications performing the same task (primary/backup or parallel). This communication is used to pass information about who is being served, who is serving whom, and who is available to serve. It is also used to pass a "heart beat" so that applications know who is primary/backup and to detect when a failure has occurred.

Whereas the present invention has been described with respect to specific embodiments thereof, it will understood that various changes and modifications will be suggested to one skilled in the art and it is intended to encompass such changes and modifications as fall within the scope of the appended claims.

We claim:

1. A multi-channel communications system comprising:
    a plurality of mobile units each having forms of identification and communications channels;
    a tower site in a geographic area also having said communications channels for communications with the mobile units;
    a plurality of dispatch agencies each having forms of identification to communicate with the mobile units in the plurality of mobile units having the same forms of identification;
    a multi-channel controller connected to said tower site in a geographic area and to said dispatch agencies for directing messages between the dispatch agencies and the mobile units according to a first form of identification over a first communications channel, for selecting a communications method in use on said first communications channel, for mapping said forms of identification to a second form of identification when said first communications channel uses an alternate communications method requiring said second form of identification, for determining said first communications channel loading, for handing off the mobile units from said first communications channel to a second communications channel at said tower site when loading on said first communications channel becomes excessive, for routing messages to the second communications channel at said tower when communications fail on said first communications channel, and for granting tower site and channel change requests to mobile units to connect to a second tower site in a second geographic area when the geographic area covered by said tower site is inadequate;
    a user interface for configuration of mobile unit and dispatch agency lookup tables, for viewing multi-channel communications system performance statistics, and for configuring multi-channel performance and redundancy parameters; and
    a database for storing the mobile unit and dispatch agency lookup tables, the multi-channel communication system performance statistics, and the multi-channel controller performance and redundancy parameters.

2. The multi-channel communications system of claim 1 wherein the communications method is time division multiple access.

3. The multi-channel communications system of claim 1 wherein the alternate communications method is one of the group consisting of AMPS cellular, EDACS data, digital cellular data, and CDPD.

4. The multi-channel communications system of claim 1 wherein each of the plurality of mobile units comprises:
   radio equipment for communicating data and control messages on the communications channels;
   a GPS receiver for determining location of the mobile unit in relation to the tower site with a known location in a geographic area to determine if the tower site is within range of the mobile unit;
   a display and keypad for reading and loading the data; and
   a vehicle logic unit for controlling the operation of the radio equipment, the display and keyboard, and the GPS receiver; generating the form of identification, interfacing the multi-channel controller, and switching the mobile unit from said tower site to the second tower site if said tower site is out of range.

5. The multi-channel communications system of claim 4 wherein the mobile unit vehicle logic unit interfaces the multi-channel controller by power up channel acquisition, by address mapping from the form of identification, by searching for a communications channel, by maintaining a list of alternate communications methods and tower site locations, by requesting channel changes, by requesting tower site changes and by handing off from one tower site to another tower to increase geographic coverage.

6. The multi-channel communications system of claim 1 wherein the tower site comprises:
   radio equipment for transmitting to and receiving from the mobile units control and data messages on the communications channels;
   a radio network controller connected to the radio equipment for controlling the radio equipment and passing the control and data messages; and
   a connection between the radio network controller and the multi-channel controller for passing the control messages and data messages between the multi-channel controller and the radio network controller.

7. The multi-channel communications system of claim 6 wherein the radio network controller adds new mobile units during a logon and a handoff, notifies the multi-channel controller of the logon, computes and loads message statistics, processes requests from the multi-channel controller, removes mobile units during a handoff and a logoff, changes polling rates and replaces polling tables, dumps and loads message statistics, requests and synchronizes primary and secondary time division multiple access (TDMA) polling tables, and reconfigures the connection to the multi-channel controller during failures.

8. The multi-channel communications system of claim 6 wherein the connection is one of a group consisting of a telephone line and a microwave link.

9. The multi-channel communications system of claim 1 wherein the dispatch agency includes a computer terminal connected to the multi-channel controller for setting up and controlling the multi-channel controller, defining a form of identification for use by the dispatch agency to identify the mobile units for which it is responsible, defining and prioritizing the communications method and the alternate communications method allowed and supported by the communications channels, granting permission to other dispatch agencies to receive messages from the mobile units for which it is responsible and requesting permission to view messages from other dispatch agencies, requesting poll rate changes, and removing mobile units due to logoff or shutdown.

10. The multi-channel communications system of claim 1 wherein the multi-channel controller comprises:
    gateways for interfacing the communications channels;
    a multi-agency router for routing messages between the mobile units and the dispatch agencies through the gateways and the communications channels; and
    a load service for performing load monitoring, balancing, and failure monitoring of the communications channels and for maintaining TDMA polling data for the communications channels.

11. The multi-channel communications system of claim 10 wherein the multi-agency router comprises:
    a message routing function for routing messages between the mobile units and the dispatch agencies;
    an identifier resolution function for determining the communications channel and method and message destination in accordance with an identifier attached to the messages;
    a packet sniffing function for monitoring the messages from the mobile units, verifying the communications channel the mobile unit is operating on, examining the messages to determine if they are data messages or control messages, and examining the source and destination of the message and telling the message routing function to route accordingly;
    a store and forward function for storing the data messages transmitted by a mobile unit when the mobile unit is changing communications channels; and
    tables for storing static and dynamic data to accomplish the routing identifier resolution and the packet sniffing functions.

12. The multi-channel control system of claim 10 wherein the load service comprises:
    a channel loading monitor for monitoring the loading on the communications channels for an overload condition;
    a dynamic table with loading information on the communications channels the load service is responsible for and for making decisions based on the loading information; and
    load balancing functions for actively and passively balancing the communications channel loads at a tower site.

13. A multi-channel communications system comprising:
    at least one mobile unit having a first communications channel and at least one form of identification;
    a first tower site in a geographic area having the first communications channel for communications with the mobile unit;
    at least one dispatch agency having at least one form of identification for use by the dispatch agency to identify the mobile unit for which the agency is responsible; and
    a multi-channel controller connected to the first tower site in a geographic area and to the dispatch agency for directing outgoing messages from the dispatch agency to the mobile unit and for routing incoming messages from the mobile unit to the dispatch agency according to the form of identification, for determining the first communications channel loading, for handing off the mobile unit from the first communications channel to a second communications channel at the tower site when loading on the first communications channel becomes excessive, for granting mobile unit requests to connect to another tower site in another geographic area when the geographic area covered by the first tower site is inadequate, and for routing outgoing and incoming messages to the second communications channel when communications fail on the first communications channel.

14. The multi-channel communications system of claim 13 wherein the first and second communications channels operate using time division multiple access.

15. The multi-channel communications system of claim 13 wherein the first channel operates using time division multiple access and the second channel operates using one of the group consisting of AMPS cellular, EDACS data, digital cellular data, and CDPD.

16. The multi-channel communications system of claim 13 wherein the mobile unit determines a pseudo signal strength for the first communications channel from the tower site by determining a mobile unit position using a GPS receiver and comparing the mobile unit position to a known position of the tower site and computing a distance from the mobile unit to the tower site, said distance being indicative of the pseudo signal strength.

17. The multi-channel communications system of claim 16 wherein the mobile unit uses the pseudo signal strength to select a tower site within communications range.

18. The multi-channel communications system of claim 13 wherein the mobile unit uses an external ID device for a static identifier.

19. The multi-channel communications system of claim 13 wherein the multi-channel controller resolves the mobile unit form of identification to an Internet Protocol address to route the incoming message to a dispatch agency to which the mobile belongs according to the Internet Protocol address.

20. The multi-channel communications system of claim 13 wherein the multi-channel controller operates redundantly on two computers each with multi-channel controller software.

21. A method of routing a data message in a multi-channel communications system from a mobile unit to a dispatch agency comprising the steps of:
  determining if the mobile unit is listed in a routing table;
  routing the message to the dispatch agency destination if the mobile unit is listed in the routing table by performing the steps of:
    verifying if the data message is on a current communications channel listed in the routing table;
    determining if a communications channel change flag is set in the routing table;
    looking up a dispatch agency destination the message is to be sent to in the routing table if the channel change flag is not set;
    routing the message to the dispatch agency destination;
    otherwise notifying a load service that a channel change is sensed if the channel change flag is set;
    looking up a dispatch agency destination the message is to be sent to in the routing table; and
  routing the message to the dispatch agency destination;
  otherwise routing the message to the dispatch agency destination if the mobile unit is not listed in the routing table by performing the steps of:
    adding the mobile unit address to the routing table by address resolution and determining the dispatch agency the mobile unit belongs to;
    adding the mobile unit address to a multi-channel communications database and generating a log report;
    looking up a dispatch agency destination the message is to be sent to in the routing table; and
    routing the message to the dispatch agency destination.

22. A method of routing a message in a multi-channel communications system from a dispatch agency to a mobile unit comprising the steps of:
  determining if the message is for a poll rate increase;
  routing the message to the mobile unit if the message is not for a poll rate increase by performing the steps of:
    determining if a channel change flag is set in a routing table;
    providing a proper format for the message for a current channel if the channel change flag is not set;
    incrementing a packet counter for use in evaluating communications channel usage;
    routing the message to the mobile unit;
    otherwise providing a proper format for the message for a the current channel and a new channel if the channel change flag is set;
    routing the data packet to the current channel and a new channel;
  incrementing the packet counter for the new channel for evaluating communications channel usage; and
  routing the message to the mobile unit;
  otherwise routing the message to the mobile unit if the message is for a poll rate increase by performing the steps of:
    routing the message to a load service;
    generating a log report;
    generating a poll rate increase message;
    sending the poll rate increase message to a radio network controller for processing; and
    routing the poll rate increase message to the mobile unit.

23. A method of passive balancing mobile unit loading on communications channels of a multi-channel communications system employing time division multiple access where the mobile units operate at a predetermined polling rate comprising the steps of:
  determining the communications channels in use at a tower site;
  monitoring the loading on the communications channels;
  calculating loading metrics for the communications channels from the number of mobile units and the mobile unit polling rates;
  sending the loading metrics to the mobile units;
  adding mobile units to a first communications channel as the mobile units come into the multi-channel communication system;
  continuing the monitoring of the communications channels;
  determining if a second communications channel at the tower site has a lower load metric than the first communications channel when said first communications channel reaches an overload condition;
  commanding mobile units added to the first communications channel after the overload conditions has been reached to change channels to the second communications if the second communications channel is available; and
  allowing the mobile units added to the first communications channel after the overload condition has been reached to stay on the first communications channel if the second communications channel is not available.

24. A method of active balancing mobile unit loading on communications channels of a multi-channel communications system employing time division multiple access where the mobile units operate at a predetermined polling rate comprising the steps of:
  determining the communications channels in use at a tower site;
  monitoring the loading on the communications channels;
  calculating loading metrics for the communications channels from the number of mobile units and the mobile unit polling rates;
  sending the loading metrics to the mobile units;
  determining when the mobile unit polling rates are changed;
  determining if a second communications channel at the tower site has a lower load metric than the first communications channel when said first communications channel reaches an overload condition;
  commanding mobile units added to the first communications channel after the overload conditions has been reached to change channels to the second communications if the second communications channel is available; and
  allowing the mobile units added to the first communications channel after the overload condition has been reached to stay on the first communications channel if the second communications channel is not available.

25. A method of mobile unit communications channel monitoring and changing in a multi-channel communications system comprising the steps of:
  determining if there is a reason for a communications channel change from a current communications channel;
  monitoring the current communications channel for messages if there is no reason for the communications channel change;
  otherwise holding off sending queued messages until the communications channel change is complete if there is a reason for a channel change;
  determining the reason for communications channel change;
  switching to a commanded channel if the reason for change is a command from a multi-channel controller by performing the steps of:
    determining if the commanded channel is acquired;
    determining if a special acknowledgement signal has been received form the multi-channel controller in a predetermined time if the commanded channel has been acquired;
    saving the commanded channel as a last used channel if the special acknowledgment signal has been received; and
    monitoring the commanded channel for messages;
  otherwise switching to a commanded channel if the reason for change is that all channels on a first tower site are overloaded by performing the steps of:
    determining if there is a second tower site based on distance to said tower site;
    requesting a least loaded channel at the second tower site;
    sending a channel request message to a multi-channel controller;
    starting a message timer in the multi-channel controller;
    waiting for a response to the channel request message;
    receiving a denied message from the multi-channel controller before the message timer has timed out;
    returning to monitoring the current communications channel;
    otherwise receiving no response to the channel request message from the multi-channel controller when the message timer has timed out;
    incrementing a count in a retry counter in the multi-channel communications controller;
    resending the channel request message if the count in the retry counter is less than a predetermined number;
    returning to monitoring the current communications channel if the count in the retry counter is more than a predetermined number;
    otherwise receiving a grant message containing a new commanded channel from the multi-channel controller before the message timer has timed out;
    switching to the new commanded channel;
    determining if the commanded channel is acquired;
    determining if a special acknowledgment signal has been received form the multi-channel controller in a predetermined time if the commanded channel has been acquired;
    saving the commanded channel as a last used channel if the special acknowledgment signal has been received; and
    monitoring the commanded channel for messages;
  otherwise switching to a commanded channel if the reason for change is that all channels on a first tower site distance are out of range by performing the steps of:
    requesting a second tower site based on distance information;
    requesting a least loaded channel at the second tower site;
    sending a channel request message to a multi-channel controller;
    starting a message timer in the multi-channel controller;
    waiting for a grant message containing a new commanded channel;
    switching to the new commanded channel;
    determining if the commanded channel is acquired;
    determining if a special acknowledgment signal has been received form the multi-channel controller in a predetermined time if the commanded channel has been acquired;
    saving the commanded channel as a last used channel if the special acknowledgment signal has been received; and
    monitoring the commanded channel for multi-channel controller messages.

26. A method of mobile unit communications channel monitoring in a multi-channel communications system comprising the steps of:
  monitoring the commanded channel for multi-channel controller messages;
  updating a table with communications channel status and loading when a multi-channel controller message is received;
  checking the table for valid position and static data;
  calculating a distance to a tower site if the position and static data is valid;
  flagging the distance calculated as valid;
  determining from the distance calculated if the tower site is in range;
  marking the communications channels at the tower site as GO in a search table if the tower site is in range and NOGO in the search table if the tower site is out of range;

reordering the search table in a proper search order; and determining if there is a reason for a communications channel change from a current communication channel.

27. A multi-channel communications system comprising:
a plurality of communications channels;
a plurality of mobile units for communicating over said communications channels said mobile units having forms of identification;
a plurality of dispatch agencies for communicating over said communications channels said dispatch agencies having a forms of identification; and
a multi-channel controller connected to said tower sites and said dispatch agencies said multi-channel controller routing messages between the mobile units and the dispatch agencies through the tower sites and over a first communications channel according to a first form of identification, the multi-channel controller selecting a communications method in use on the first communications channel, and the multi-channel controller mapping the forms of identification to a second form of identification when the first communications channel uses an alternate communications method requiring the second form of identification.

28. The multi-channel communications system of claim 27 wherein any of said plurality of mobile units communicate with one of said dispatch agencies over one of said communications channels according to a form of identification common to the mobile units and the dispatch agency.

29. The multi-channel communications system of claim 27 further comprising a tower sites in geographic areas said tower sites having said plurality of communications channels for communicating with said mobile units.

30. The multi-channel communications system of claim 27 wherein the multi-channel controller determines loading of the communications channels, hands off mobile units from a first communications channel to a second communications channel when loading on said first communications channel is excessive.

* * * * *